US012732033B2

(12) United States Patent
Kondo et al.

(10) Patent No.: US 12,732,033 B2
(45) Date of Patent: Sep. 8, 2026

(54) STATOR CORE

(71) Applicants: DENSO CORPORATION, Kariya-city (JP); DENSO PRESSTECH INC., Toyokawa City (JP)

(72) Inventors: Keiji Kondo, Kariya-city (JP); Toshihiro Takei, Kariya-city (JP); Yuichi Kudose, Kariya-city (JP); Hiroshi Endo, Kariya-city (JP); Masaki Ohira, Toyokawa city (JP)

(73) Assignees: DENSO CORPORATION, Kariya-city (JP); DENSO PRESSTECH INC., Toyokawa City (JP)

( * ) Notice: Subject to any disclaimer, the term of this patent is extended or adjusted under 35 U.S.C. 154(b) by 180 days.

(21) Appl. No.: 18/645,202

(22) Filed: Apr. 24, 2024

(65) Prior Publication Data

US 2024/0364151 A1 Oct. 31, 2024

(30) Foreign Application Priority Data

Apr. 27, 2023 (JP) ................................ 2023-073415
Mar. 4, 2024 (JP) ................................ 2024-032246

(51) Int. Cl.
*H02K 1/18* (2006.01)
*H02K 1/16* (2006.01)

(52) U.S. Cl.
CPC ............ *H02K 1/185* (2013.01); *H02K 1/165* (2013.01)

(58) Field of Classification Search
CPC ......... H02K 1/185; H02K 1/165; H02K 1/146
See application file for complete search history.

(56) References Cited

U.S. PATENT DOCUMENTS

| | | | | |
|---|---|---|---|---|
| 2013/0276297 | A1 | 10/2013 | Kurosaki | |
| 2015/0130311 | A1 | 5/2015 | Murakami et al. | |
| 2018/0331587 | A1 | 11/2018 | Tokizawa | |
| 2021/0408849 | A1 * | 12/2021 | Egashira | H02K 15/021 |
| 2022/0103025 | A1 | 3/2022 | Vindler et al. | |

FOREIGN PATENT DOCUMENTS

| | | | |
|---|---|---|---|
| CN | 112421818 | B | 11/2023 |
| JP | 2007295740 | A | 11/2007 |
| JP | 2015139265 | A | 7/2015 |
| JP | 2021-078197 | A | 5/2021 |
| JP | 2022134965 | A | 9/2022 |

* cited by examiner

*Primary Examiner* — Joseph Ortega
(74) *Attorney, Agent, or Firm* — Precision Patents, P.C.

(57) ABSTRACT

A stator core includes a core body a having a cylindrical shape and a bolt fixing portion which includes a bolt insertion hole extending in an axial direction and into which a fixing bolt is inserted, and is capable of being fastened to a housing by a fixing bolt while the fixing bolt is inserted into the bolt insertion hole. The core body is a laminate in which core sheets made of steel plates having an insulating resin layer on a surface are laminated. The bolt fixing portion is provided as a separate member from the core body and is attached to an outside of an outer peripheral surface of the core body in a radial direction.

8 Claims, 20 Drawing Sheets

STATOR CORE

CROSS REFERENCE TO RELATED APPLICATIONS

The present application based on and claims the benefit of priority from Japanese Patent Applications No. 2023-73415 filed in Japan filed on Apr. 27, 2023, and No. 2024-32246 filed in Japan filed on Mar. 4, 2024, the entire disclosure of the above application is incorporated herein by reference.

TECHNICAL FIELD

The disclosure of this specification relates to a stator core used in a rotary electric machine.

BACKGROUND

As a prior art related to a stator of a rotary electric machine, the stator is made of a laminated body. The laminated body is manufactured by stacking a plurality of steel plates or by bending a steel plate in a stacking manner. The stator is fixed on a base by fastening at least one bolt. In this arrangement, the stator is required to be fixed in a stable fashion. However, environment of the stator, such as thermal stress, and vibrations, could damage and deteriorate a fixing structure of the stator. In the above aspects, or in other aspects not mentioned, there is a need for further improvements in a stator core.

SUMMARY

In the first solution, a stator core fixed to a stator fixing member by a fixing bolt, comprising: a core body having a cylindrical shape; and a plurality of bolt fixing portions which includes an insertion portion extending in the axial direction and through which the fixing bolt is inserted and is able to be fixed to the stator fixing member by the fixing bolt while the fixing bolt is inserted into the insertion portion, wherein the core body is a laminated body in which a core sheet made of a steel plate having an insulating resin layer on surfaces are laminated, and wherein the bolt fixing portion is provided as a separate member from the core body, and is attached to an outside of an outer peripheral surface of the core body in a radial direction.

The stator core includes the core body which is a laminated body of a core sheet, and a plurality of bolt fixing portions provided with a member separate from the core body, and the bolt fixing portions are attached to an outside of an outer peripheral surface of the core body in the radial direction. In this configuration, during the manufacturing process of the stator core, the bolt fixing portion is attached to the core body by, e.g., welding or fitting with an engagement shape. Thereafter, the stator core is fixed to the stator fixing member by tightening the fixing bolt at the bolt fixing portion. In this case, at the time of attaching the bolt fixing portion to the core body in the previous step, the thermal stress may be applied to the core sheet of the core body due to welding heat during a welding process and frictional heat during a fitting process, and then the insulating resin layers of the core sheets may be damaged with the permanent strain. Therefore, when the fixing bolt is tightened at the bolt fixing portion in a subsequent process, the insulating resin layer is prevented from being damaged with a permanent strain, and further it is possible to suppress a decrease of the axial tightening force due to the permanent strain. As a result, it is possible to maintain a proper state of the stator core even after the bolts are tightened.

In the second solution, the bolt fixing portion, not a laminated body of steel plates, includes: end plate portions provided on both axial direction sides of the bolt fixing portion and fixed to the core body; and an insertion body which forms the insertion portion and is disposed to be sandwiched between the end plate portions on the both axial direction sides.

Since the bolt fixing portion is not a laminated body of steel plates, that is, it does not have an insulating resin layer, the axial tightening force does not decrease due to thermal stress. The bolt fixing portion is attached to the core body by end plates provided on both axial direction sides of the bolt fixing portion, and the fixing bolt is inserted into the insertion body provided between the end plates on both axial direction sides. In this case, an attaching process of the bolt fixing portion to the core body may be performed by using the end plate portions provided on the both axial direction sides, therefore the attaching process may be performed easily. In addition, on the outer peripheral surface of the core body in the radial direction on a side where the bolt fixing portion is attached, the insertion body may be just placed to face the outside of the outer peripheral surface, if the outer peripheral surface of the core body is a cooling surface area to a cooling fluid, it is possible to widen the cooling surface area contacting the cooling fluid and to improve cooling performance.

In the third solution, a head side end plate portion on a side of the head portion of the fixing bolt among the end plate portions provided on both axial direction sides of the bolt fixing portion is flush with an axial direction end surface of the core body and is arranged to be in contact with the outer peripheral surface of the core body, and wherein the head side end plate portion is joined to the core body by welding on a side opposite to the axial direction end surface of the core body among both axial direction surfaces of the head side end plate portion.

If a head side end plate portion (end plate portion on a side of the bolt head) is joined to the core body by welding so as to be flush with the axial direction end surface of the core body, there is a concern that the axial tightening force could be decreased due to the weld bead (welding mark). In view of this point, it is an employed structure in which the head side end plate portion is joined to the core body by welding at a side opposite to the axial direction end surface of the core body among both axial direction surfaces of the head side end plate portion. Thereby, a decrease in the axial tightening force after fixing the bolt can be effectively suppressed.

In the fourth solution, the bolt fixing portion includes: a cylindrical portion forming the insertion portion provided by a bent shape of the plate material; and a joining portion which extends from the cylindrical portion and is joined to the outer peripheral surface of the core body.

In the stator core having the configuration above, the bolt fixing portion includes a cylindrical portion which is formed by a bent shape of a plate material and in which the fixing bolt is inserted, and a joining portion which is joined to the outer peripheral surface of the core body. Since the bolt fixing portion is not a laminated body of steel plates, that is, it does not have an insulating resin layer, the axial tightening force does not decrease due to thermal stress. Furthermore, the cooling fluid can flow not only to the exposed surface on the outside of the stator but also to a gap between the cylindrical portion and the joining portion in the bolt fixing portion, thereby it is possible to improve cooling performance.

In the fifth solution, the bolt fixing portion has a length in the axial direction shorter than a length of the core body in the axial direction.

In the configuration in which the core body and the bolt fixing portion are separate bodies, the axial length of the bolt fixing portion may be arbitrarily determined with respect to the axial length of the core body. In other words, the axial length of the bolt fixing portion may be easily changed without having to prepare multiple types of core sheets forming the core body. If the outer peripheral surface of the core body is a cooling surface area by the cooling fluid, it is possible to widen the cooling surface area contacting with the cooling fluid, and further improve the cooling performance by making a length of the bolt fixing portion in the axial direction shorter than a length of the core body in the axial direction.

In the sixth solution, the bolt fixing portion is attached to the core body such that at least one of the axial direction end surfaces on both axial direction sides is located at a core middle position in the axial direction on the outer peripheral surface of the core body, and wherein a position of an axial direction end surface of the bolt fixing portion, which is a core middle position, does not match with a lamination boundary line of the core sheets extending in the circumferential direction. In the case that the axial direction end surface of the bolt fixing portion is located at a core middle position in the axial direction on the outer peripheral surface of the core body, if a position of the axial end surface of the bolt fixing portion matches a position of the lamination boundary line of the core sheets, a core side corner (edge) of the bolt fixing portion cuts into a boundary portion between the core sheets due to vibrations or the like, there is a concern that the core sheets are broken into pieces. In view of this point, a position of the axial direction end surface of the bolt fixing portion, which is a core middle position, is placed on a position that does not match with the lamination boundary line of the core sheets in the axial direction. This prevents the core sheet from being broken into pieces.

In the seventh solution, the bolt fixing portion is attached to the core body such that at least one of the axial direction end surfaces on both axial direction sides is located at a core middle position in the axial direction on the outer peripheral surface of the core body, and wherein the axial direction end surface of the bolt fixing portion at a core middle position is provided with an uneven portion having an uneven shape in the axial direction at least on a side facing the outer peripheral surface of the core body.

It is an employed structure in which an uneven portion having an uneven shape in the axial direction is provided on the axial direction end surface at the intermediate position of the core. In this case, in a front view of the stator core, since the uneven surface that is the axial direction end surface of the bolt fixing portion intersects the lamination boundary line of the core sheets, the core side corner (edge) of the bolt fixing portion is prevented from cutting into a boundary portion between the core sheets. This prevents the core sheet from being broken into pieces.

In the eighth solution, the core body has a back yoke formed in an annular shape, and wherein end plate portions are fixed to both axial direction sides of the core body while being in contact with the axial direction end surfaces of the back yoke, and wherein the bolt fixing portions are attached at predetermined intervals in the circumferential direction between the end plate portions on both axial direction sides.

Therefore, it is an employed structure in which the end plate portions on both axial direction sides are formed in an annular shape, and are provided to be in contact with the axial direction end surfaces of the back yoke in the core body. Further, it is an employed structure in which a plurality of bolt fixing portions are connected at predetermined intervals in the circumferential direction by the end plate portion. Thereby, the bolt fixing portions that are spaced apart from each other in the circumferential direction may be suitably provided at desired intervals.

In the ninth solution, the end plate portion has a positioning portion that performs radial positioning with respect to the core body.

In the above structure, the annular end plate portion has a positioning function for positioning the core body in the radial direction. Thereby, it is possible to easily adjust the position of each bolt fixing portion with respect to the core body, and to suppress the generation of vibration and noise due to a self centering function of the end plate portion.

In the tenth solution, the core body includes: a back yoke formed in an annular shape; and a plurality of teeth which extend in the radial direction from the back yoke and are arranged in a predetermined interval in a circumferential direction of the core body, and wherein the stator core is formed with slots between the plurality of teeth adjacent in the circumferential direction, and wherein the core sheet includes: a plurality of first portions that are opening recesses for forming the slots; and second portions that are provided at predetermined intervals in the circumferential direction on a side opposite to slot opening side in the radial direction, wherein the core body is formed with one of a coupler pair extending straight in the axial direction by the second portion of the core sheet, and wherein the bolt fixing portion is provided with the other one of the coupler pair extending straight in the axial direction, and wherein the bolt fixing portion is attached to the core body by engaging the other one of the coupler pair of the bolt fixing portion to the one of the coupler pair of the core body. In a stator core having a laminated structure in which core sheets are laminated in multiple layers, there is a concern that position of slot recesses (first portion) of the core sheets in the axial direction may shift in the circumferential direction. In this regard, in the above configuration, it is an employed structure in which a bolt fixing portion separate from the core body is used for positioning the slot recess of the core sheets in the circumferential direction. That is, it is an employed structure in which: one of a coupler pair extending straight in the axial direction is formed in the core body by the second portion of the core sheet; the other one of the coupler pair extending straight in the axial direction is formed in the bolt fixing portion; and the other one of the coupler pair of the bolt fixing portion is engaged with the one of the coupler pair of the core body. This makes it possible to align the slot recesses in the stacked core sheet as the bolt fixing portion is attached to the core body.

In the eleventh solution, the core body has a helical core structure in which a core sheet having a belt-shape is stacked in a helical manner, and the core sheet is stacked in a helical manner while the circumferential positions of the second portions are matched in the axial direction.

In a stator core having a helical core structure, a concern of a positional misalignment of the slots in the circumferential direction may be increased when the core sheet having the belt-shape is laminated in a helical manner. In this regard, the core sheet is stacked in a helical manner while the circumferential positions of the second portion are matched in the axial direction. Thereby, in the stator core having a helical core structure, the slot recesses in the core sheet can be suitably aligned.

In the twelfth solution, the slots are formed to open radially inward in the core body, and the core sheet is formed with slits extending radially outward from the first portion in the core sheet, and a recess as the second portion at a center position between the circumferentially adjacent slits.

In a stator core with a helical core structure, a slit is formed in the core sheet that extends radially outward from the slot recess (first portion), which makes it suitable for stacking a linear belt-shaped core sheet in a helical manner. Further, since the recess is formed at the center position between the circumferentially adjacent slits, it is possible to suppress an excessive decrease of a strength of the core sheet in a structure in which the recesses and the slits are formed on both width direction sides of the core sheet, respectively.

In the thirteenth solution, the core body has a helical core structure in which a core sheet having a belt-shape is stacked in a helical manner, and the bolt fixing portion is welded to the outer peripheral surface of the core body, and a welded portion thereof also serves as a seat fixing portion that fixes a longitudinal end of the core sheet on an axial direction end surface of the core body.

It is an employed structure in which the welded portion for attaching the bolt fixing portion to the outer peripheral surface of the core body also serves as a sheet fixing portion for fixing the longitudinal end of the core sheet. As a result, in the core body having a helical core structure, it is possible to prevent the longitudinal end of the core sheet (i.e., the winding start end and winding finish end of the core sheet) from peeling and improve a workability performance in a welding work process.

In the fourteenth solution, the bolt fixing portion is attached to the core body while protruding more in the axial direction than an axial direction end surface of the core body on at least one of both axial direction ends.

It is an employed structure in which the bolt fixing portion is attached so as to protrude more in the axial direction than the axial direction end surface of the core body. In this case, if the stator is fixed to the stator fixing member (the housing) by the fixing bolt, the core body is fastened and fixed by the fixing bolt while the core body is separated from the stator fixing member and the fixing bolt. Thereby, inconveniences such as noise caused by a decrease in the axial tightening force in the stator core can be effectively suppressed.

In the fifteenth solution, the bolt fixing portion is attached to the outer peripheral surface of the core body by welding, and the welding position of the bolt fixing portion to the outer peripheral surface of the core body is divided into a plurality of pieces in the axial direction.

It is an employed structure in which the welding position of the bolt fixing portion to the outer peripheral surface of the core body is divided into a plurality of pieces in the axial direction. As a result, a loop of eddy current generated in the core body in the stacking direction of the core sheets becomes smaller, and it is possible to reduce loss.

BRIEF DESCRIPTION OF DRAWINGS

The disclosure is further described with reference to the accompanying drawings in which.

DETAILED DESCRIPTION

Figure 1:
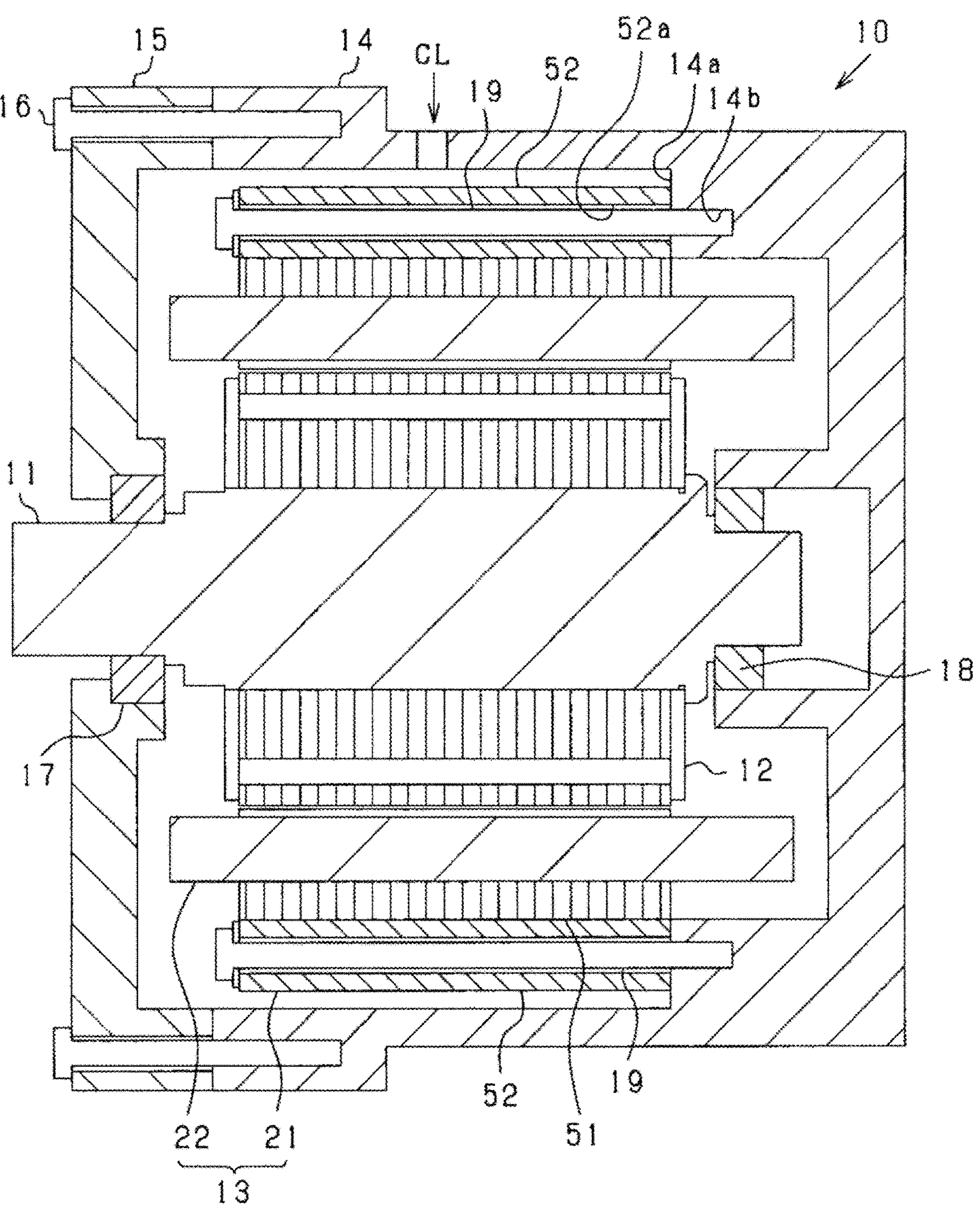
FIG. 1 is a vertical cross-sectional view of a rotary electric machine.

As a prior art related to a stator of a rotary electric machine, it is known that a stator core having a laminated structure in which core sheets made of electromagnetic steel sheets or the like are laminated in multiple layers in an axial direction. In addition, it is known that the stator core is provided with a plurality of slots into which the stator windings are inserted, bolt fixing portions (tabs) are provided in a protruding manner in a radial direction from an outer peripheral surface of the core, and is fixed to a housing or the like, e.g., see JP2021-78197A.

In the existing technology including the above-mentioned JP2021-78197A, in the stator core having a laminated structure, a main body portion provided with slots and a bolt fixing portion (tab portions) that is tightened and fixed by a fixing bolt are configured as an integral member. In other words, it is an employed structure in which each core sheet of the stator core has an annular portion forming the slots and a protruding portion forming a bolt fixing portion, and a laminated body of core sheets is fastened with bolts at the bolt fixing portion. In this case, the core sheet is generally made of a steel plate with an insulating resin layer on its surface, and if thermal stress is applied to the stator core after bolting, the steel plate expands due to the thermal expansion and compresses the insulating resin layer on the surface of the core sheet, then the insulating resin layers may be damaged with permanent strain. In the fastened portion using the fixing bolt, there is a concern that axial tightening force of the bolt may be decreased due to this permanent strain, and vibration and noise may occur in the stator.

The present invention has been made in view of the above problems, and it is an object of the present invention to provide a stator core capable of maintaining a proper state even after being fixed with bolts.

First Embodiment

In the following disclosure, embodiments of the rotary electric machine according to the present disclosure are described with reference to the drawings. In the following embodiments and modifications, parts that are the same or equivalent to each other are denoted by the same reference numerals in the drawings, and the description of the parts denoted by the same reference numerals is referred to. Amotor as the rotary electric machine of this embodiment is used, for example, as an electric motor for a vehicle or an electric motor for an aircraft.

The rotary electric machine 10 according to the present embodiment is a permanent magnet type synchronous multiphase AC motor, and has an inner rotor structure (internal rotation structure). A schema of the rotary electric machine 10 is illustrated in FIG. 1. FIG. 1 is a vertical cross-sectional view of a rotary electrical machine 10 in a direction along a rotating shaft 11. In the following description, a direction in which the rotating shaft 11 extends is referred to as an axial direction, a direction extending radially around the rotating shaft 11 is referred to as a radial direction, and a direction extending circumferentially around the rotating shaft 11 is referred to as a circumferential direction.

The rotary electric machine 10 includes: a rotor 12 fixed to a rotating shaft 11; a stator 13 having a cylindrical shape provided at a position surrounding the rotor 12; a housing 14 accommodating the rotor 12 and the stator 13; and a cover 15 fixed to the housing 14 on a side of one end in an axial direction. The rotor 12 and the stator 13 are arranged coaxially and face each other in the radial direction. The housing 14 has a bottomed cylindrical shape that is open at one end in the axial direction, and the cover 15 is attached to an open end using a plurality of bolts 16 as fasteners. Bearings 17 and 18 are provided in the housing 14 and the cover 15, and the rotating shaft 11 and the rotor 12 are supported by the bearings 17 and 18 in a rotatable manner.

The housing 14 is provided with a base portion 14*a* for fixing the stator 13, and a screw hole 14*b* extending in the axial direction is formed in the base portion 14*a*. The stator 13 is disposed so as to be in contact with an axial direction end surface of the base portion 14*a*, and is fixed to the housing 14 by inserting the fixing bolts 19 through the stator 13 and fastening them into the screw holes 14*b*. The housing 14 corresponds to a stator fixing member.

The rotary electric machine 10 is cooled in the housing 14 using a cooling fluid such as lubricating oil. For example, if the rotary electric machine 10 is arranged with the rotating shaft 11 extending in the horizontal direction, the cooling fluid CL is supplied from the upper side of the housing 14 as shown in FIG. 1, and cool the stator 13 by preferably flowing the cooling fluid CL along the outer peripheral surface of the stator 13.

Note that the rotary electric machine 10 is a rotary electrical machine having three-phase windings, and may be a permanent magnet synchronous motor, a wire-wound field type, or an induction machine.

Figure 2:
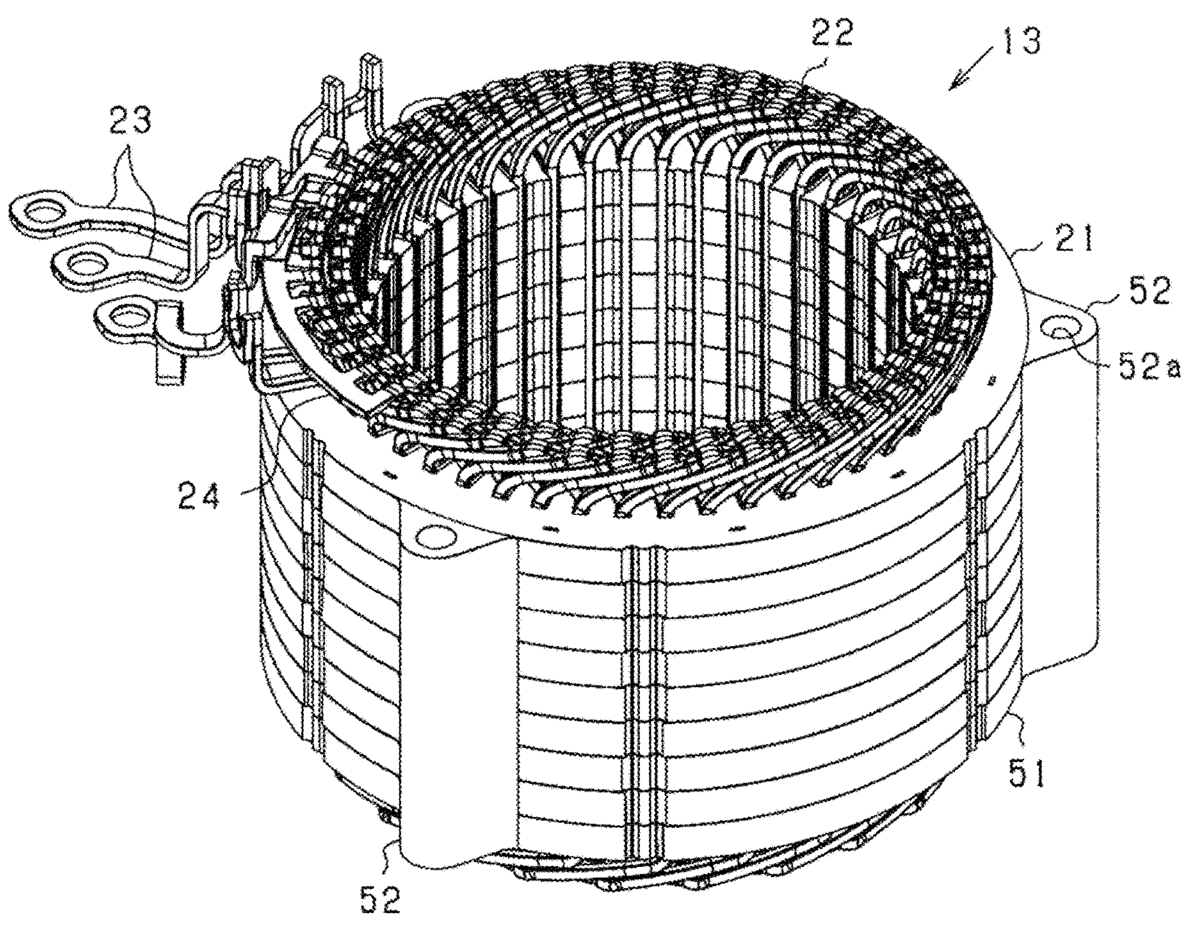
FIG. 2 is a perspective view of a stator.

FIG. 2 is a perspective view showing a configuration of the stator 13. As shown in FIG. 2, the stator 13 includes a stator core 21 having an annular shape and a stator winding 22 wound around the stator core 21. The stator winding 22 has a U-phase winding, a V-phase winding, and a W-phase winding as phase windings for each phase, and the power line bus bar 23 is connected to one of ends and a neutral line bus bar 24 is connected to the other one of ends of the phase windings of each phase.

Figure 3:
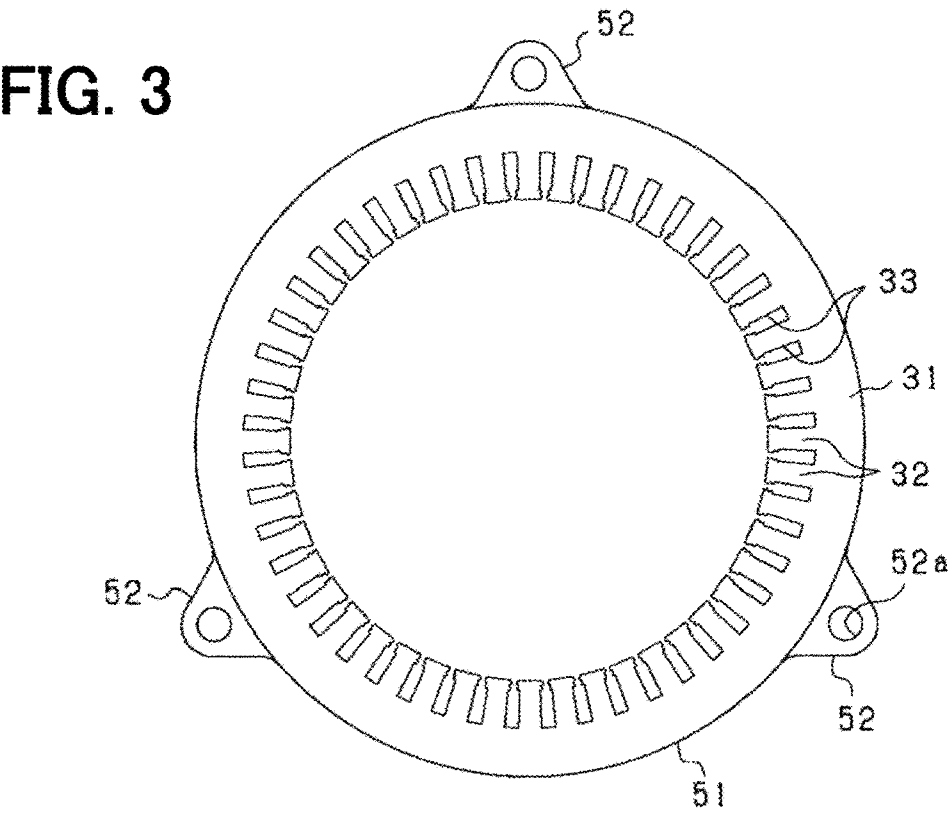
FIG. 3 is a plan view of a stator core.

FIG. 3 is a plan view of the stator core 21. The stator core 21 includes a back yoke 31 in an annular shape and a plurality of teeth 32 which protrudes radially inward from the back yoke 31 and are arranged at a predetermined distance in the circumferential direction, and is formed with slots 33 between adjacent teeth 32. The slots 33 have an opening shape extending in the radial direction as a longitudinal direction, and are provided at equal intervals in the circumferential direction in the stator core 21. The slots 33 open radially inward. A stator winding 22 is arranged in a winding manner within each slot 33. In this embodiment, the stator core 21 has a laminated structure in which electromagnetic steel sheets, which are magnetic materials, are laminated in the axial direction.

The stator winding 22 generates magnetic flux by being supplied with electric power (AC power) from a power source via an inverter not shown. In this embodiment, the stator winding 22 having a segment structure is used, and the configuration thereof is explained below using FIG. 4.

Figure 4:
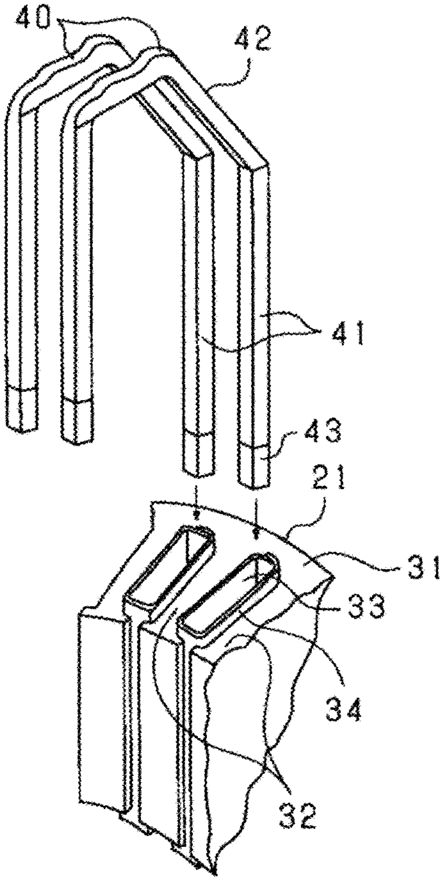
FIG. 4 is a perspective view showing a conductor segment and a portion of the stator core.

As shown in FIG. 4, conductor segments 40 are divided conductors formed by forming an electric conductor of a constant thickness and a substantially rectangular cross section (a flat rectangular shape) into a substantially U-shape, and includes a pair of straight portions 41 that are straight, and a turn portion 42 that is formed in a bent shape to connect the pair of straight portions 41. The pair of straight portions 41 has a length longer than the thickness of the stator core 21 in the axial direction. The conductor segment 40 is constructed using a rectangular conducting wire in which the conductor is covered with an insulating coating, and a distal end of each straight portion 41 is served as a conductor exposed portion 43 where the conductor is exposed by removing off the insulating coating.

A plurality of conductor segments 40 are inserted into the slots 33 of the stator core 21 while being arranged in a row in the radial direction. In this embodiment, each straight portion 41 of the conductor segment 40 is accommodated in the slot 33 in a stacked state of a plurality of layers (for example, four layers). In the conductor segment 40, a pair of straight portions 41 are accommodated in two slots 33 separated by a predetermined coil pitch. Note that an insulating sheet 34 is provided in the slot 33 to electrically insulate between the stator core 21 and the stator winding 22 (the conductor segment 40).

The pair of straight portions 41 of the conductor segment 40 are housed in the two slots 33 with their radial positions shifted by one. For example, if one of the straight portions 41 is accommodated in the "n"th position from a back side in the radial direction (a side of the back yoke), the other one of the straight portions 41 is accommodated in the "n+1"th position from the back side in the radial direction.

In inserting each conductor segment 40 into the slot 33 of the stator core 21, the straight portion 41 of each conductor segment 40 is inserted from a side of the first end among a side of the first end and a side of the second end of both axial direction ends of the stator core 21, and the distal end of the straight portion 41 protrudes from the side of the second end. In this case, one of coil end portions is formed by the turn portion 42 of the conductor segment 40 on a side of the first end of the stator core 21. Further, a side opposite to the side of the turn portion of each straight portion 41 is bent in the circumferential direction at a side of the second end of the stator core 21, and the other one of the coil ends is formed by connecting the straight portions 41 of different conductor segments 40 each other.

Figure 5:
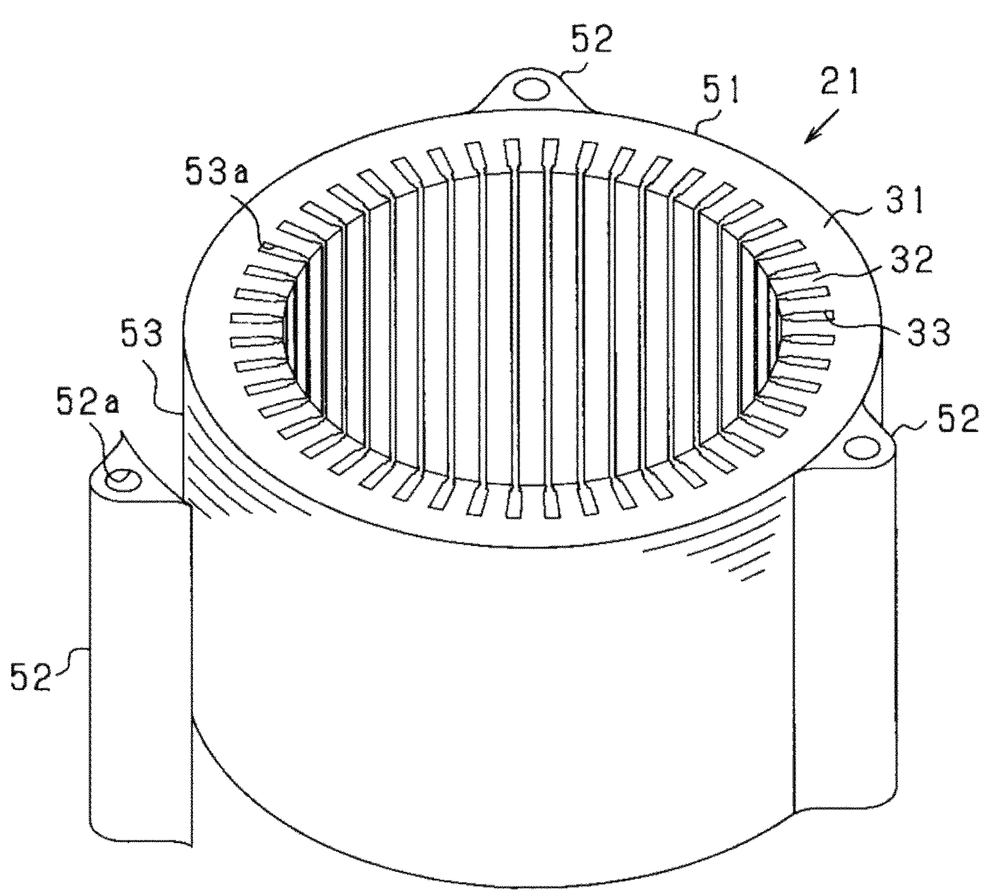
FIG. 5 is a perspective view showing a part of the stator core in an exploded manner.

This embodiment is characterized by a configuration of the stator core 21, and the configuration of the stator core 21 is described in detail below. FIG. 5 is a perspective view showing a part of the stator core 21 in an exploded manner.

As shown in FIG. 5, the stator core 21 includes a core body 51 having a cylindrical shape and a plurality of bolt fixing portions 52 provided to protrude in the radial direction from a radial out side of an outer peripheral surface of the core body 51 and extend in the axial direction. The core body 51 and the bolt fixing portion 52 are each provided as separate members and are integrated by a joining members. In this embodiment, the axial lengths (axial lengths) of the core body 51 and the bolt fixing portions 52 are the same. Note that the bolt fixing portions 52 are also referred to as tab portions.

The core body 51 is a laminated body in which core sheets 53 made of electromagnetic steel sheets are laminated. The core sheet 53 is formed into an annular shape by punching an electromagnetic steel sheet, for example, and has an insulating resin layer on surfaces of the electromagnetic steel sheet, as is well known. Slot recesses **53*a* for forming slots are formed in the core sheet 53 at predetermined intervals in the circumferential direction, the slot recesses 53*a* are connected in the axial direction while the core sheets 53 are stacked in multiple layers, and the slots 33 are formed. That is, in the core body 51, a back yoke 31 in an annular shape and a plurality of teeth 32 are formed by stacking the core sheets 53, and the back yoke 31 and teeth 32 are placed to surround and form the slots 33. In the core body 51, each core sheet 53** in a laminated state is fixed by at least one of crimping, welding, and adhesion.

The bolt fixing portion 52 is a fixing member to be tightened and fixed by the fixing bolt 19 (see FIG. 1) when fixing the stator core 21 to the housing 14. The bolt fixing portion 52 has a bolt insertion hole **52*a* that penetrates in the axial direction, and the fixing bolt 19 can be inserted into the bolt insertion hole 52*a*. The bolt insertion hole 52*a* corresponds to the insertion portion. The bolt fixing portion 52 is made of, for example, a metal material such as iron. Further, unlike the core body 51, the bolt fixing portion 52** does not have a laminated structure in which a large number of plate materials are laminated in the axial direction, but is an integral from one end to the other end in the axial direction.

The bolt fixing portion 52 has a surface facing the outer peripheral surface of the core body 51 among outer peripheral surfaces thereof, and serves as a joint surface that is joined to the outer peripheral surface of the core body 51. The joint surface is a concave curved surface, and a curvature thereof is preferably the same as that of the outer peripheral surface of the core body 51 or larger than that of the outer peripheral surface of the core body 51. In other words, a radius of the joint surface of the bolt fixing portion 52 is preferably the same as that the outer peripheral surface of the core body 51 or smaller than that of the outer peripheral surface of the core body 51. In this case, since the curvature of the joint surface of the bolt fixing portion 52 is the same as that of the outer peripheral surface of the core body 51 or larger than that of the outer peripheral surface of the core body 51, at least both peripheral direction ends of the bolt fixing portion 52 are in contact with the outer peripheral surface of the core body 51 when the bolt fixing portion 52 is attached to the outer peripheral surface of the core body 51.

The bolt fixing portion 52 is attached to the outer peripheral surface of the core body 51 by a joining member such as welding or brazing. For example, in a configuration in which the bolt fixing portion 52 is joined to the outer peripheral surface of the core body 51 by welding, it is preferable that the bolt fixing portion 52 is welded at a boundary portion with the core body 51 in a straight line manner. However, the bolt fixing portion 52 may be attached to the core body 51 by welding at multiple locations in the axial direction. At this time, the thermal stress is previously applied to the core body 51 due to the welding heat during the welding process, and the insulating resin layers are in state after it is damaged with the permanent strain.

As shown in FIG. 1, in the rotary electric machine 10, the stator 13 is fixed to the housing 14 by screwing the fixing bolts 19 while the fixing bolts 19 are inserted into the bolt insertion holes 52*a* of the bolt fixing portion 52. In this case, since the axial tightening force of the bolt is applied after the insulating resin layer is damaged with a permanent strain, it is possible to suppress a decrease in the axial tightening force due to the permanent strain of the insulating resin layers on the surfaces of the core sheets Thereby, a proper state of the stator core 21 is maintained even after the bolts are tightened.

Figure 6:
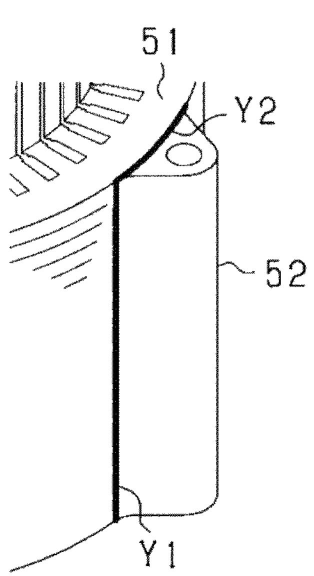
FIG. 6 is a perspective view showing a state in which a bolt fixing portion is fixed to the core body.

FIG. 6 shows a welding range in which the bolt fixing portion 52 is welded to the core body 51. In FIG. 6, the bolt fixing portion 52 is fixed to the core body 51 by performing welding at the boundary portion in the circumferential direction between the bolt fixing portion 52 and the core body 51. In this case, the bolt fixing portion 52 is configured to be welded in a range that is between the both axial direction ends of the core body 51 and continues linearly in the axial direction ("Y1" in the drawing). Note that it is preferable that welding "Y1" is performed on both circumferential direction sides of the bolt fixing portion 52. In the bolt fixing portion 52, welding may be performed at the radial boundary portion with the core body 51 ("Y2" in the drawing).

In the case of FIG. 6, the welded portion "Y1" between the bolt fixing portion 52 and the core body 51 may also serve as a joint portion that joins the core sheets 53 together in the core stacking direction.

Figure 7A:
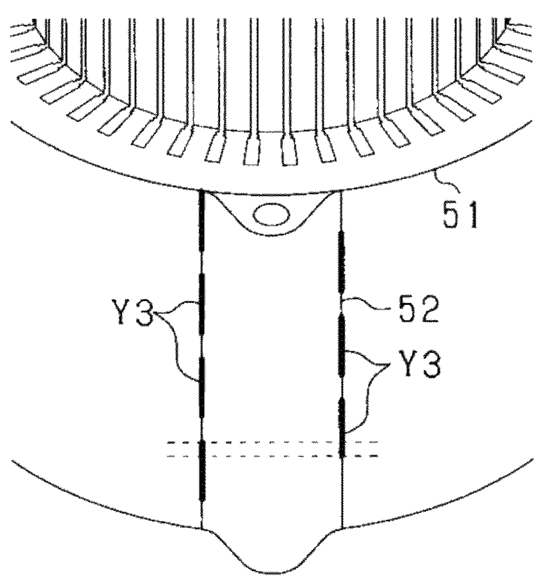
FIG. 7A is a perspective view showing a state in which a bolt fixing portion is fixed to the core body.

Instead of the configuration shown in FIG. 6, it is also possible to use a configuration shown in FIG. 7A. In FIG. 7A, welding is performed ("Y3" in the drawing) at a plurality of locations separated in the axial direction at the boundary portion in the circumferential direction between the bolt fixing portion 52 and the core body 51. In other words, it is a structure in which welded portions and non-welded portions are arranged alternately in the axial direction between the both axial direction ends of the bolt fixing portion 52. Further, in FIG. 7A, welded portions and non-welded portions arranged in the axial direction are arranged alternately in a left side and right side zig-zag manner on both sides of the bolt fixing portion 52 in the circumferential direction (i.e., in a staggered manner). Further, in the bolt fixing portion 52, it is preferable that the welding range on one side in the circumferential direction and the welding range on the other side in the circumferential direction partially overlap in the axial direction.

Figure 7B:
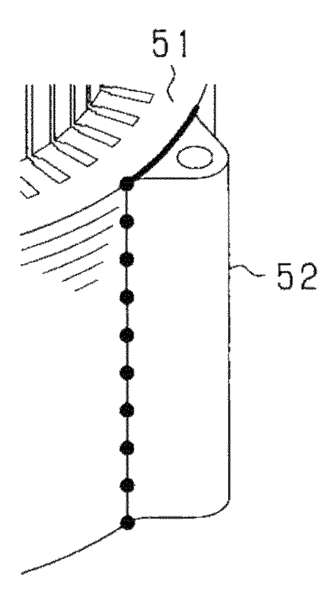
FIG. 7B is a perspective view showing a state in which a bolt fixing portion is fixed to the core body.

In addition, as shown in FIG. 7B, a plurality of spot welds may be performed on the boundary portion in the circumferential direction between the bolt fixing portion 52 and the core body 51 so as to be arranged in the axial direction.

Figure 8:
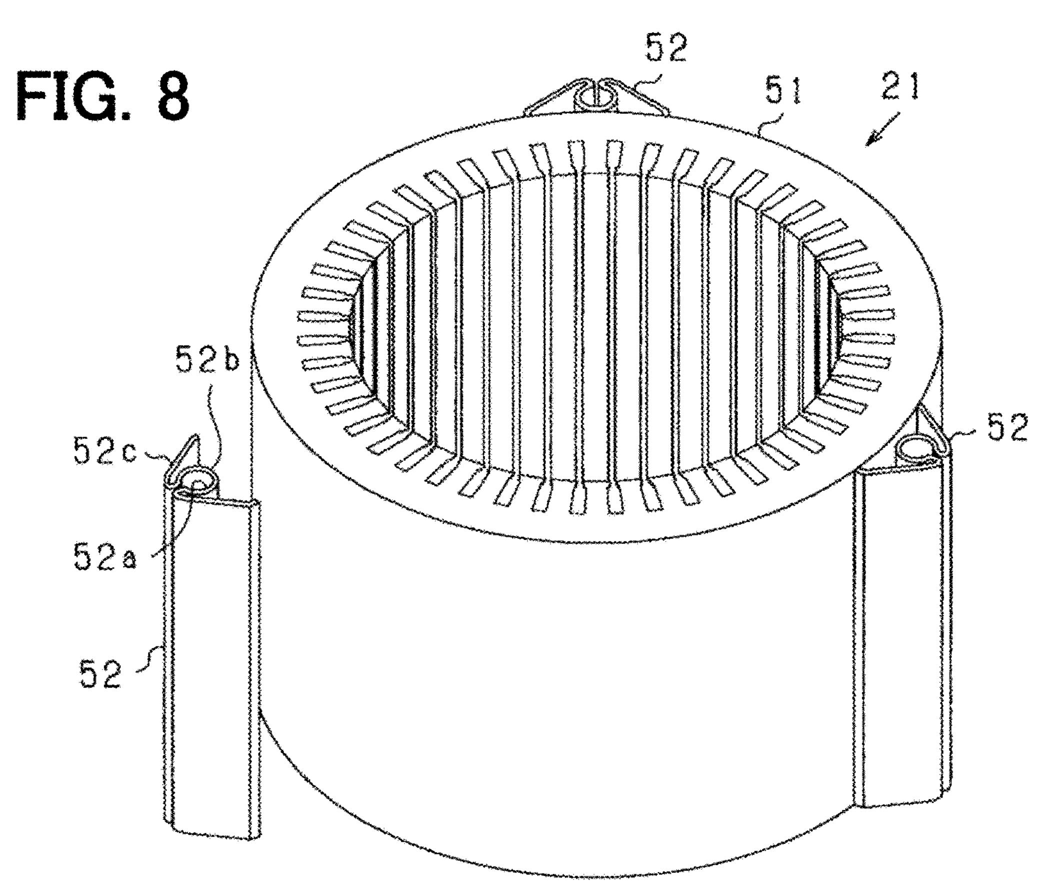
FIG. 8 is a perspective view showing a part of the stator core in an exploded manner.

The bolt fixing portion 52 may have a configuration shown in FIG. 8. In FIG. 8, the bolt fixing portion 52 is formed by bending a plate made of iron or the like. Specifically, the bolt fixing portion 52 includes a cylindrical portion 52*b* that forms a bolt insertion hole 52*a* through which the fixing bolt 19 is inserted, and a joining portion 52*c* that extends from the cylindrical portion 52*b* and is joined to the outer peripheral surface of the core body 51. In this case, the bolt fixing portion 52 is attached to the core body 51 by welding abutment portions between the joining portion 52*c* and the core body 51.

In the configuration shown in FIG. 8 above, in the bolt fixing portion 52, the cooling fluid flows not only to the exposed surface on an outside of the stator but also to a gap between the cylindrical portion 52*b* and the joining portion 52*c*, cooling performance can be improved.

In a manufacturing process of the rotary electric machine 10, it is preferable to perform steps in the following order. First, a large number of core sheets 53 having annular shapes are prepared. At this time, each core sheet 53 does not have a protruding portion (tab portion) that protrudes outward in the radial direction, and the material yield can be improved compared to the case where the core sheet 53 has a protruding portion. Then, a laminating process is performed on a large number of core sheets 53, and a process is performed to form the laminated body of the core sheets by performing at least one of crimping, welding, or bonding on each of the core sheets 53 in a laminated state. On the other hand, a plurality of bolt fixing portions 52 shown in FIG. 5 or 8 are formed by cutting a steel material, pressing a steel plate material, or the like.

Then, a process is performed to fix the bolt fixing portions 52 on a plurality of attaching positions spaced apart at predetermined intervals in the circumferential direction at an outside of the outer peripheral surface of the core body 51 (the laminated body of the core sheets) by welding, brazing, or the like. When the bolt fixing portion 52 is fixed, the thermal stress may be applied to the core body 51, then the insulating resin layers of the core sheets 53 may be damaged with the permanent strain. Further, the stator winding 22 is wound around the stator core 21, and the power line bus bar 23 and the neutral line bus bar 24 are connected as wiring portions of the coil ends. Thereby, the stator 13 is completed.

Thereafter, the stator 13 is fixed to the housing 14 with a plurality of fixing bolts 19. When the bolt is tightened, an axial tightening force is created in each bolt fixing portion 52 due to tightening of the fixing bolt 19. In this case, if each bolt fixing portion 52 is composed of a laminated body of steel plates, in other words, if the bolt fixing portion 52 is formed of the core sheets 53 together with the core body 51, the insulating layer on the surface of the steel plate may be compressed due to the thermal expansion, and there is a concern that the axial tightening force may be decreased due to the permanent strain of the insulating layers. However, in this embodiment, since the core body 51 and the bolt fixing portion 52 are made separate, the insulating resin layers on the surfaces of the core sheet are damaged with the permanent strain due to a thermal input during the core body 51 and the bolt fixing portion 52 are joined by welding etc., it is possible to suppress a decrease of the axial tightening force after tightening the bolt.

The above embodiment can provide the following effects.

It is an employed structure in which the stator core 21 has the core body 51 and the plurality of bolt fixing portions 52 formed in separate members, and the bolt fixing portions 52 are attached to an outside of an outer peripheral surface of the core body 51 in the radial direction. In this case, even if the stator core 21 is attached to the housing 14 (the stator fixing member) by tightening the fixing bolt 19, the axial tightening force of the fixing bolt 19 is prevented from decreasing. Thereby, a proper state of the stator core 21 can be maintained even after the bolts are tightened.

It is an employed structure in which the bolt fixing portion 52 is nor provided with a laminated structure in which a large number of plate materials are laminated in the axial direction. Thereby, it is possible to suppress a decrease in the axial tightening force of the bolt fixing portion 52 which is separate from the core body 51, and it is possible to maintain a stable fixed state of the stator core 21.

It is an employed structure in which a welding position of the bolt fixing portion 52 to the outer peripheral surface of the core body 51 is divided into a plurality of pieces in the axial direction. As a result, a loop of eddy current generated in the core body 51 in the stacking direction of the core sheets 53 becomes smaller, and it is possible to reduce loss.

In the stator core 21 having the configuration shown in FIG. 8, the bolt fixing portion 52 includes a cylindrical portion 52*b* which is formed by a bent shape of a plate material and in which the fixing bolt 19 is inserted, and the joining portion 52*c* which is joined to the outer peripheral surface of the core body 51. In this case, in the bolt fixing part 52, the cooling fluid can flow not only to the exposed surface on the outside of the stator but also to a gap between the cylindrical portion 52*b* and the joining portion 52*c*, it is possible to improve cooling performance. Moreover, since the bolt fixing portion 52 is a bent body made of a plate material, it is possible to reduce a thermal capacity and to reduce distortion due to excessive heat input during welding to the core body 51.

Hereinafter, other embodiments are described focusing on differences from the first embodiment.

Second Embodiment

Figure 9:
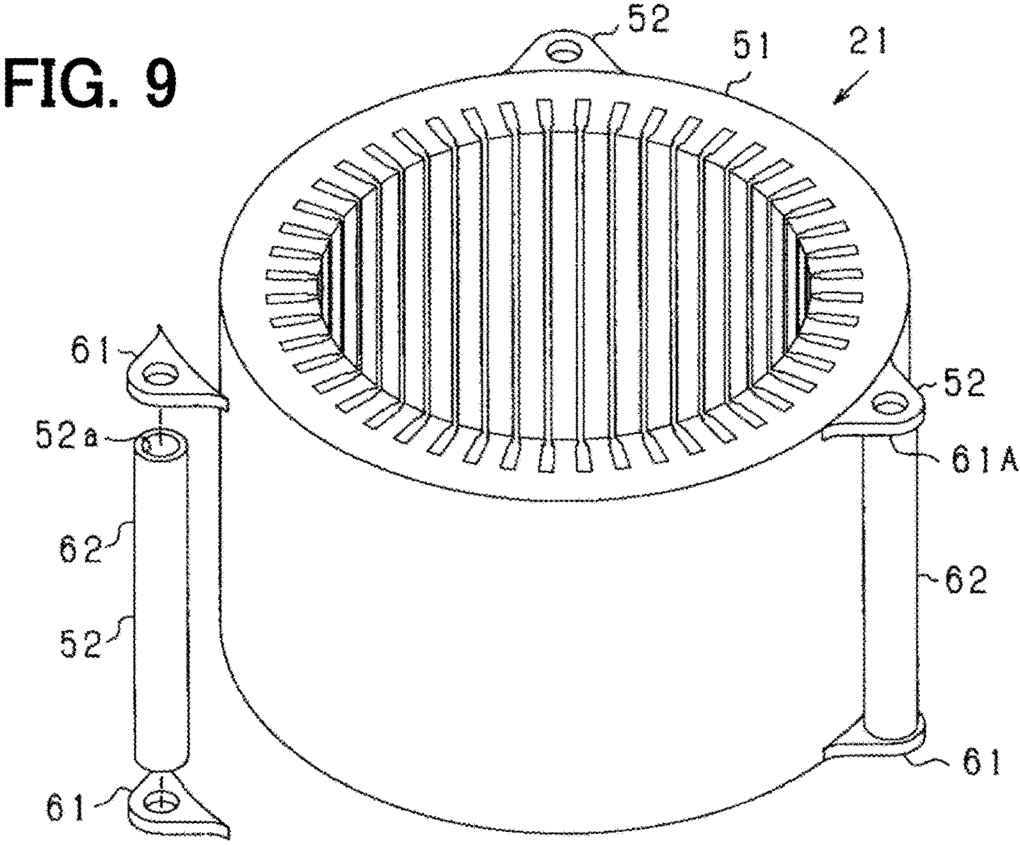
FIG. 9 is a perspective view showing a part of a stator core in an exploded manner in a second embodiment.

FIG. 9 is a perspective view showing a configuration of the stator core 21 in a second embodiment. In the stator core 21 shown in FIG. 9, the bolt fixing portion 52 includes a pair of end plate portions 61 provided at one axial end and the other axial end of the bolt fixing portion 52, and an insertion body 62 provided so as to be sandwiched between a pair of the end plate portions 61 provided on the both axial direction sides. The insertion body 62 has a cylindrical shape, and its hollow portion serves as an insertion portion (bolt insertion hole 52a) into which the fixing bolt 19 is inserted. A part of the end plate portion 61 protrudes radially outward from the core body 51 while being fixed to the core body 51. Each end plate portion 61 is joined to the outer peripheral surface of the core body 51 by welding or the like. Welding of each end plate portion 61 is preferably performed in the circumferential direction at the boundary portion with the core body 51.

A manufacturing process for the stator core 21 includes a welding and fixing process of the core body 51 and the end plate portion 61, and a welding and fixing process of the end plate portion 61 and the insertion body 62. At this time, it is preferable that the end plate portion 61 and the insertion body 62 are welded and fixed to the core body 51 while the core body 51 is compressed in the axial direction. Note that an order of the process for fixing each of these members is arbitrary, therefore, an order of the process may be a process in which the insertion body 62 is fixed between the end plate portions 61 on the both axial direction sides after fixing the end plate portions 61 to the core body 51, or a process in which the end plate portions 61 are fixed to the core body 51 after fixing the insertion body 62 to the end plate portions 61.

If the stator core 21 having the configuration shown in FIG. 9 is fixed to the housing 14, the fixing bolts 19 are inserted from a side of the other end plate portion 61 and are fastened while one of the end plate portion 61 comes in contact with the base portion 14*a* of the housing 14.

As described above, in the configuration of the present embodiment, an attaching process of the bolt fixing portion 52 to the core body 51 may be performed by using the end plate portions 61 provided on the both axial direction sides, therefore the attaching process may be performed easily. Further, the insertion body 62 of the bolt fixing portion 52 only needs to be disposed on an outside of the outer peripheral surface of the core body 51, and if the outer peripheral surface of the core body 51 is a cooling surface area by the cooling fluid, it is possible to widen the cooling surface area of contacting the cooling fluid and improve cooling performance. Furthermore, it is possible to reduce thermal capacity of the bolt fixing portion 52, and reduce distortion due to excessive heat input during welding to the core body 51.

In addition, it is possible to easily fit to a stator 13 having different axial length by changing a length of the insertion body 62 in the bolt fixing portion 52, it is possible to suppress an increase in cost due to design changes.

Figure 10:
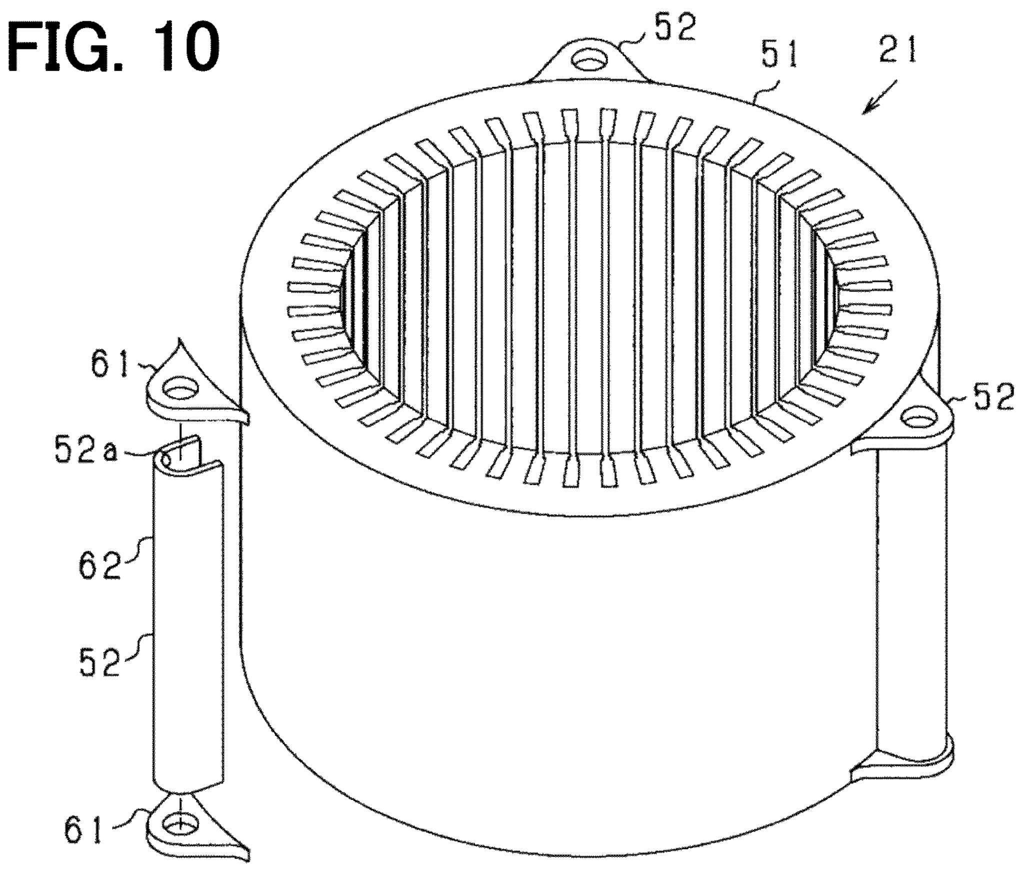
FIG. 10 is a perspective view showing a part of a stator core in an exploded manner in the second embodiment.

Further, it is possible to perform design change of the insertion body 62, e.g., the insertion body 62 may be changed to have a U-shape in cross section as shown in FIG. 10.

Here, in the configuration shown in FIG. 9 described above, end plate portions 61 are provided on the both axial direction sides of the bolt fixing portion 52, and one of the end plate portions 61 on the both axial direction sides (e.g., an upper side of the end plate portion 61 in the drawing) is the head side end plate portion 61A on which a side of the head of the fixing bolt 19 is placed. The head side end plate portion 61A is disposed to be flush with the axial direction end surface of the core body 51 and to be in contact with the outer peripheral surface of the core body 51. In this case, if a welding is performed on an upper surface side of the head side end plate portion 61A in the drawing, a weld bead (welding trace) is formed on the upper surface side.

Figure 11:
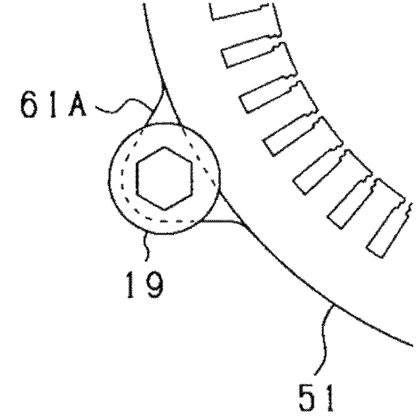
FIG. 11 is a plan view showing a state in which the stator core is fixed by bolts.

Further, as shown in FIG. 11, a part of the head of the fixing bolt 19 used for fixing the stator core 21 may be axially opposed to the axial direction end surface of the core body 51. The fixing bolt 19 is, e.g., a bolt with a hexagonal socket, and a seat surface of a washer portion provided integrally with the head thereof faces an axial direction end surface of the core body 51. In other words, the seat surface of the fixing bolt 19 protrudes from the bolt fixing portion 52 and covers a side of the core body 51. In this case, there is a concern that the axial tightening force may decrease after the fixing bolt 19 is fastened due to the weld bead.

Figure 12:
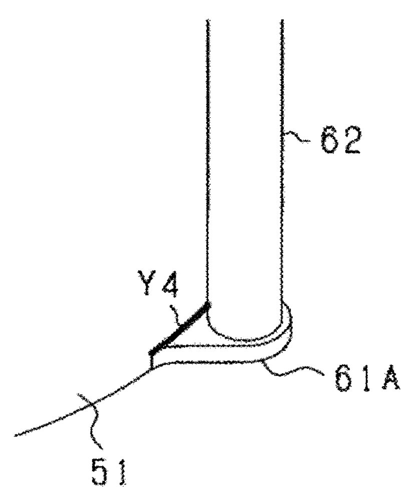
FIG. 12 is a perspective view showing a state in which an end plate is fixed to the core body.

As a countermeasure for this, as shown in FIG. 12, it is preferable that the head side end plate portion 61A is joined by welding (shown in "Y4" in the drawing) to the core body 51 at a side opposite to the axial direction end surface of the core body 51 among the axial direction both surfaces of the head side end plate portion 61A. Welding is not performed on a side of the head side end plate portion 61A that is flush with the axial direction end surface of the core body 51. In this case, even if the weld bead is formed by welding and fixing the end plate portion 61, an occurrence of a decrease in the axial tightening force is suppressed. In other words, it is possible to effectively suppress a decrease in the axial tightening force after the bolts are fixed.

Third Embodiment

Figures 13A, 13B, 13C:
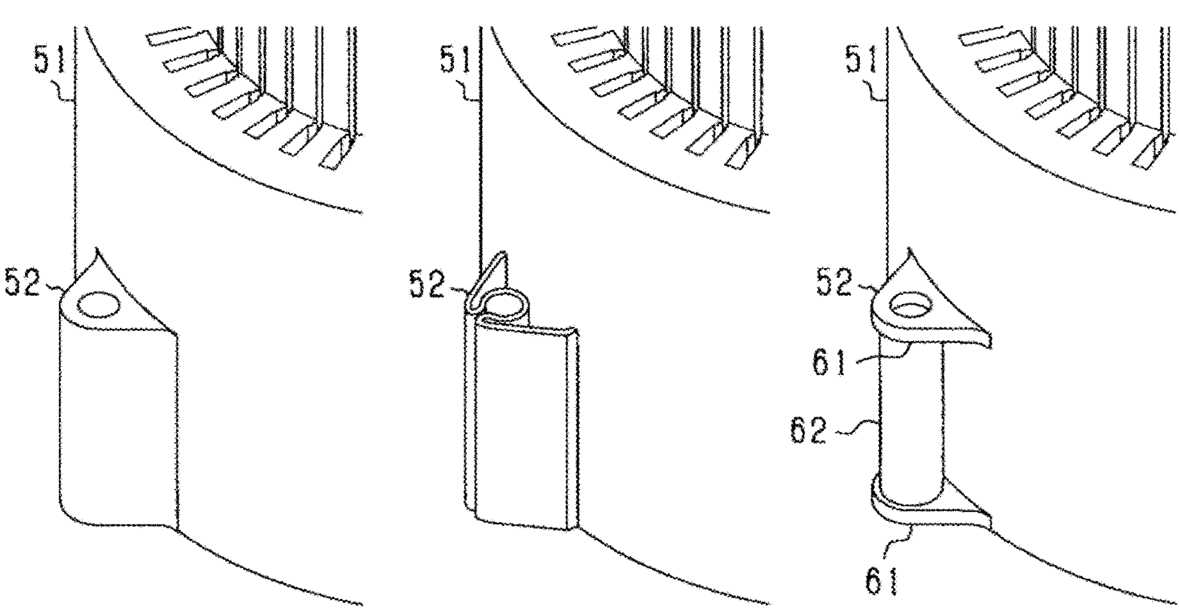
FIG. 13A is a perspective view showing a configuration of a stator core in a third embodiment.
FIG. 13B is a perspective view showing a configuration of a stator core in a third embodiment.
FIG. 13C is a perspective view showing a configuration of a stator core in a third embodiment.

In this embodiment, a length of the bolt fixing portion 52 in the axial direction is shorter than a length of the core body 51 in the axial direction. FIG. 13A, FIG. 13B and FIG. 13C are perspective views showing the structure of the stator core 21 in a third embodiment.

In FIG. 13A, in a configuration in which the bolt fixing portion 52 is joined to the outer peripheral surface of the core body 51, the axial length of the bolt fixing portion 52 is shorter than the axial length of the core body 51. In FIG. 13B, the bolt fixing portion 52 is formed by bending a plate material (see FIG. 8), and the axial length of the bolt fixing portion 52 is shorter than the axial length of the core body 51. In FIG. 13C, in a structure (see FIG. 9 and FIG. 10) in which the bolt fixing portion 52 includes a pair of end plate portions 61 on the both axial direction sides and an insertion body 62 between the pair of end plate portions 61, an axial length of the bolt fixing portion 52 is shorter than an axial length of the core body 51.

In the configuration in which the core body 51 and the bolt fixing portion 52 are separate bodies, the axial length of the bolt fixing portion 52 may be arbitrarily determined with respect to the axial length of the core body 51. In other words, it is not necessary to prepare the bolt fixing portion 52 according to the axial length of the core body 51, and the axial length of the bolt fixing portion 52 may be a easily changeable value, e.g., the axial length of the bolt fixing portion 52 may be a fixed value regardless of the axial length of the core body 51, or an adjusted value to satisfy a needs. If the outer peripheral surface of the core body 51 is a cooling surface area by the cooling fluid, it is possible to widen the cooling surface area contacting with the cooling fluid, and further improve the cooling performance by making the axial length of the bolt fixing portion 52 shorter than the axial length of the core body 51.

Figure 14A:
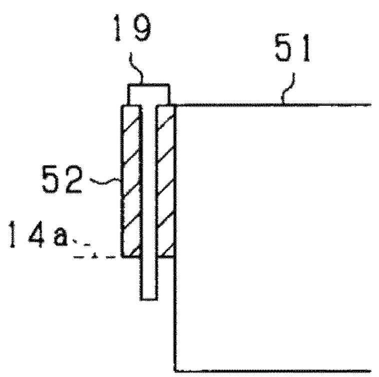
FIG. 14A is a plan view showing a configuration example of a stator core.
Figure 14B:
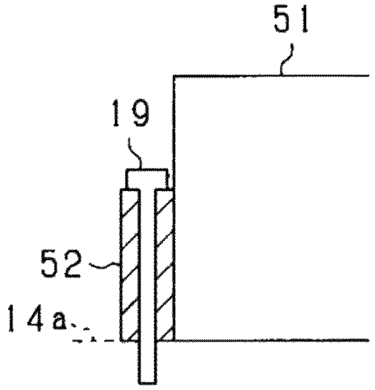
FIG. 14B is a plan view showing a configuration example of a stator core.
Figure 14C:
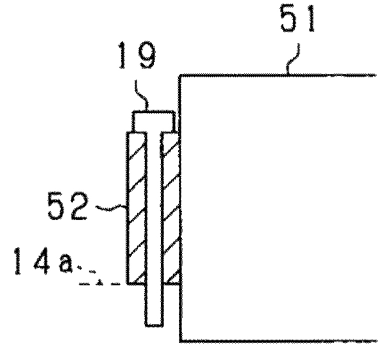
FIG. 14C is a plan view showing a configuration example of a stator core.

A configuration in which the length in the axial direction of the bolt fixing portion 52 is shorter than the length in the axial direction of the core body 51 is preferably one of those shown in FIG. 14A, FIG. 14B and FIG. 14C.

In FIG. 14A, the bolt fixing portion 52 is attached to the core body 51 while the end surface on a side of the bolt head among end surfaces on the both axial direction sides of the bolt fixing portion 52 is flush with the axial direction end surface of the core body 51. In FIG. 14B, the bolt fixing portion 52 is attached to the core body 51 while the end surface on an opposite side of the bolt head among end surfaces on the both axial direction sides of the bolt fixing portion 52 is flush with the axial direction end surface of the core body 51. In FIG. 14C, the end surfaces on the both axial direction sides of the bolt fixing portion 52 are not flush with the axial direction end surface of the core body 51, and the bolt fixing portion 52 is attached on a position that is a middle portion of the core body 51 in the axial direction. In addition, in FIG. 14A, FIG. 14B and FIG. 14C, a size of the head of the fixing bolt 19 is adjusted so as not to interfere with the core body 51.

In configurations shown in FIG. 14A, FIG. 14B and FIG. 14C, the bolt fixing portion 52 is attached to the core body 51 such that its axial direction end surface is located on a core middle position in the axial direction on the outer peripheral surface of the core body 51. In this case, if a position of the axial direction end surface of the bolt fixing portion 52 matches a position of a lamination boundary line of the core sheets 53, the core side corner (edge) of the bolt fixing portion 52 cuts into a boundary portion between the core sheets due to vibrations or the like, there is a concern that the core sheets 53 are broken into pieces. As a countermeasure, the following configurations may be considered. FIG. 15, FIG. 16A, FIG. 16B and FIG. 16C are front views of the core body 51 and the bolt fixing portion 52.

Figure 15:
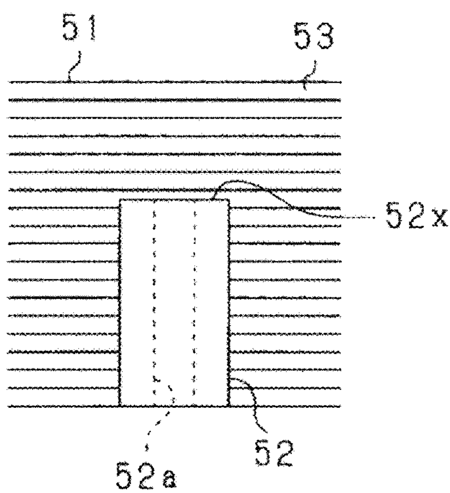
FIG. 15 is a plan view of a core body and a bolt fixing portion.

In FIG. 15, a position of the axial direction end surface 52*x* of the bolt fixing portion 52 is at a position that does not match the lamination boundary line of the core sheets 53 extending in the circumferential direction. This prevents the core-side corner portion (edge) of the bolt fixing portion 52 from cutting into the boundary portion between the core sheets, and further prevents the core sheets 53 from being broken into pieces.

Figures 16A, 16B, 16C:
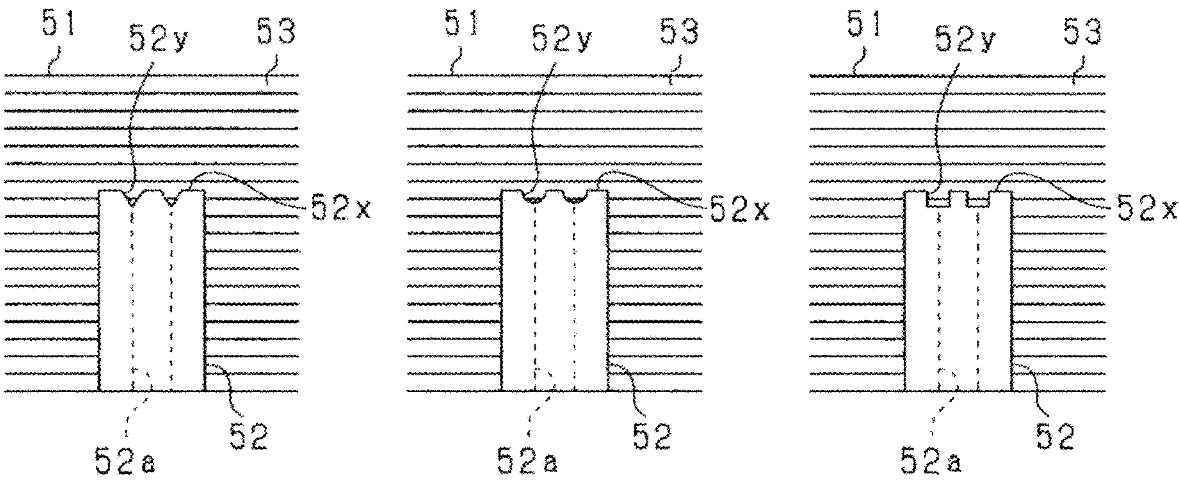
FIG. 16A is a plan view of a core body and a bolt fixing portion.
FIG. 16B is a plan view of a core body and a bolt fixing portion.
FIG. 16C is a plan view of a core body and a bolt fixing portion.

In addition, in FIG. 16A, FIG. 16B and FIG. 16C, a recess 52*y* forming an uneven portion in the axial direction is provided on the axial direction end surface 52*x* of the bolt fixing part 52 at least on a side opposing the outer peripheral surface of the core body 51. In this case, in a front view of the stator core 21, since the uneven surface that is the axial direction end surface 52*x* of the bolt fixing portion 52 intersects the lamination boundary line of the core sheets 53, the core side corner (edge) of the bolt fixing portion 52 is prevented from cutting into a boundary portion between the core sheets. This prevents the core sheet 53 from being broken into pieces.

The shape of the recess 52*y* provided on the axial direction end surface 52*x* of the bolt fixing portion 52 is arbitrary. For example, in FIG. 16A, the recess 52*y* has a depression shape in a wedge-shape. In FIG. 16B, the recess has a depression shape in a semicircular shape. In FIG. 16C, the recess has a depression shape in a rectangular shape. In any case, the axial direction end surface 52*x* of the bolt fixing portion 52, which is an uneven portion due to the recess 52*y*, is formed to satisfy the following: the head of the fixing bolt 19 can be seated thereon; the uneven surface intersects with the lamination boundary line of the core sheets 53; and a part on a side facing the outer peripheral surface of the core body 51 is missing.

Note that the configurations in FIG. 15, FIG. 16A, FIG. 16B and FIG. 16C may be applied to each configuration shown in FIG. 14A, FIG. 14B and FIG. 14C. In other words, it is applicable to both a side of the bolt head and a side opposite to the bolt head of the bolt fixing portion 52. Note that the configurations in FIG. 15, FIG. 16A, FIG. 16B and FIG. 16C may be applied to each configuration shown in FIG. 13A and FIG. 13C. In addition, in FIG. 13B, it is preferable that the position of the axial end portion of the joining portion 52*c* is at a position that does not match the lamination boundary line of the core sheets 53 extending in the circumferential direction.

Fourth Embodiment

Figure 17A:
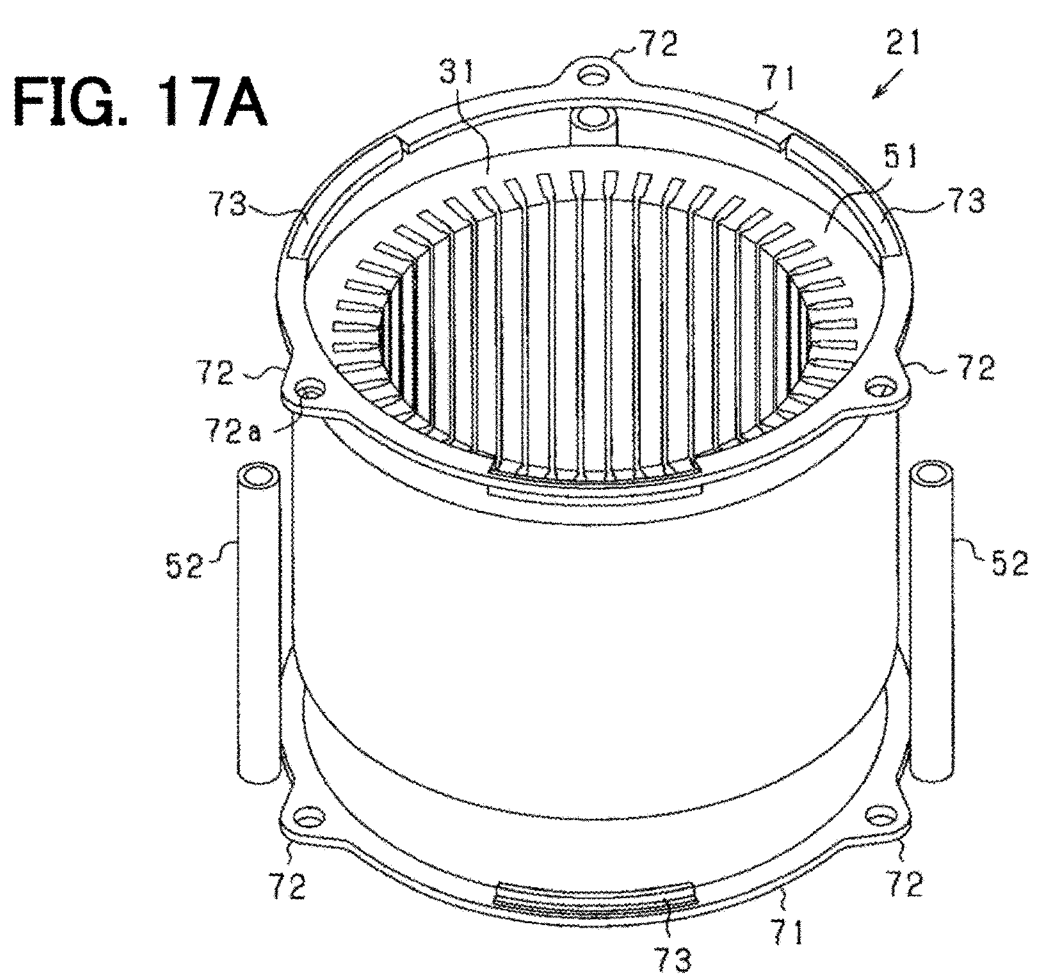
FIG. 17A is a perspective view showing a configuration of a stator core in a fourth embodiment.
Figure 17B:
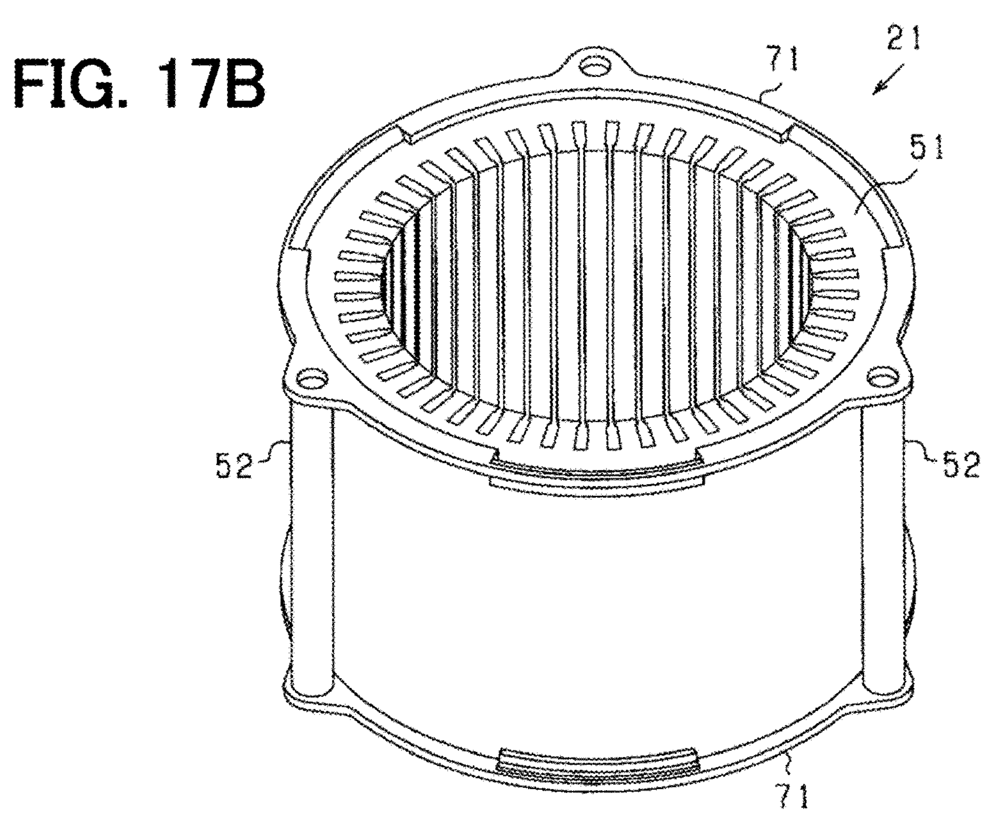
FIG. 17B is a perspective view showing a configuration of a stator core in a fourth embodiment.

FIG. 17A and FIG. 17B are perspective views showing the structure of the stator core 21 in a fourth embodiment.

In the stator core 21 shown in FIG. 17A and FIG. 17B, an annular end plate portions 71 are fixed to a side of one axial direction end and the other axial direction end of the core body 51 while being in contact with the axial direction end surfaces of the back yoke 31. The end plate portion 71 has a plurality of protruding portions 72 that protrude outward in the radial direction at predetermined intervals in the circumferential direction. Then, the bolt fixing portions 52 each having a cylindrical body are fixed between the end plate portions 71 on the both axial direction sides, more specifically, between the protruding portions 72 on the both axial direction sides. Each one of the bolt fixing portions 52 are attached to the stator core 21 at predetermined intervals in the circumferential direction by fixing the bolt fixing portions 52 between the protruding portions 72 on the both axial direction ends. A through hole 72*a* is formed in each protruding portion 72, and the through hole 72*a* on a side of the end plate portion 71 and the bolt insertion hole 52*a* of the bolt fixing portion 52 are communicated with each other while the bolt fixing portion 52 is attached. Further, the end plate portion 71 is provided with positioning portions 73 at a plurality of locations in the circumferential direction for positioning the core body 51 in the radial direction. The positioning portions 73 are formed as bent portions in which a part of the disc portion of the end plate portion 71 is bent in the axial direction, and a radial position in the radial direction of the plate portion 71 is determined by engaging each positioning portion 73 with the outer peripheral surface of the core body 51. The end plate portions 71 are each fixed to the both axial direction sides of the core body 51 by fastening the fixing bolts 19. However, in this case, the bolt fixing portions 52, which is an insertion body, is interposed between the end plate portions 71 on the both axial direction sides, so that the core body 51 is not excessively tightened.

As described above, in this embodiment, it is an employed structure in which the end plate portions 71 on both axial direction sides are formed into an annular shape, and are provided to be in contact with the axial direction end surfaces of the back yoke 31 in the core body 51. Further, it is an employed structure in which a plurality of bolt fixing portions 52 are connected at predetermined intervals in the circumferential direction by the end plate portions 71. Thereby, the bolt fixing portions 52 that are spaced apart from each other in the circumferential direction may be suitably provided at desired intervals.

Further, the annular end plate portion 71 has a positioning function for positioning the core body 51 in the radial direction. Thereby, it is possible to easily adjust the position of each bolt fixing portion 52 with respect to the core body 51, and to suppress the generation of vibration and noise due to a self centering function of the end plate portion 71.

Fifth Embodiment

Figure 18:
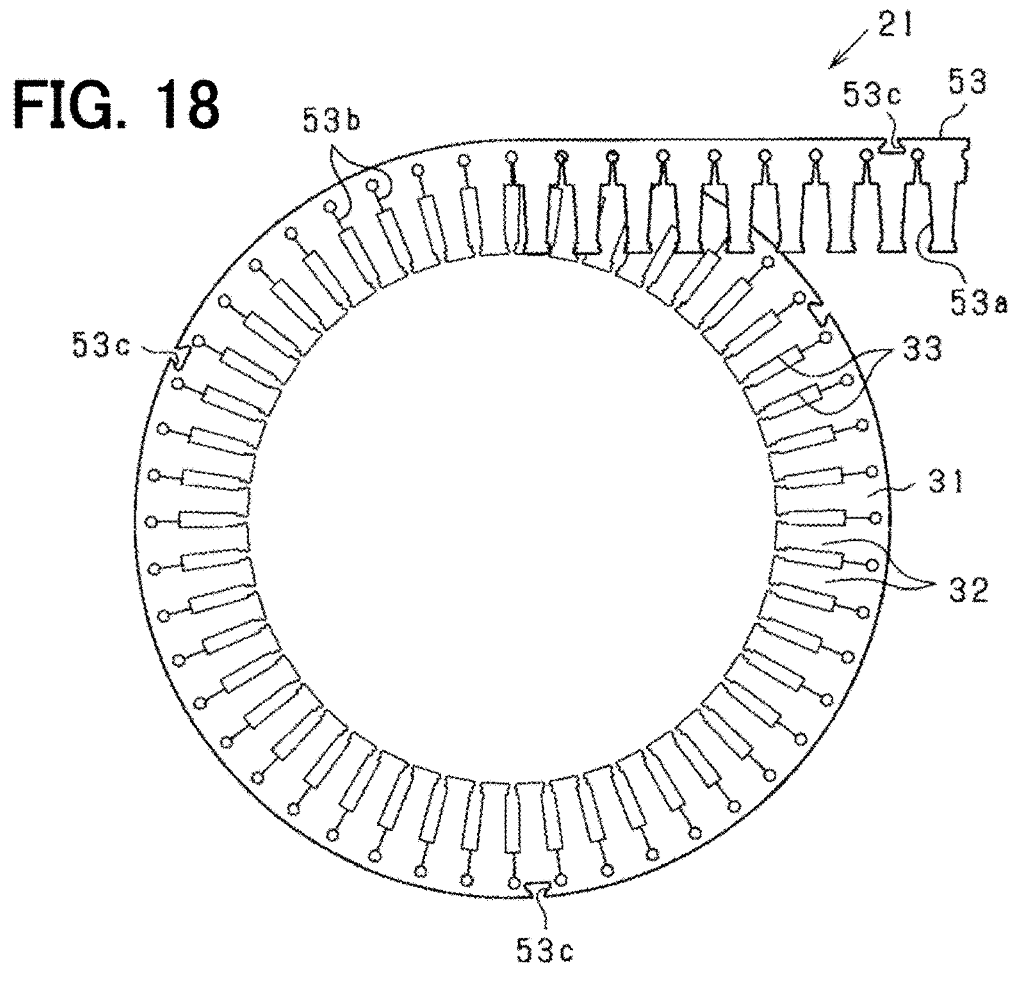
FIG. 18 is a plan view showing a stator core having a helical core structure in a fifth embodiment.

In this embodiment, the stator core 21 has a helical core structure. FIG. 18 is a plan view showing the stator core 21 having a helical core structure.

The stator core 21 is constructed by stacking a core sheet 53 having a belt-shape stacked in a helical manner. Slot recesses 53*a* for forming slots are formed in the core sheet 53 at predetermined intervals in the circumferential direction, the slot recesses 53*a* are connected in the axial direction in a state where the core sheet 53 is stacked in a helical manner, and the slots 33 are formed. The slots 33 open radially inward. Further, the core sheet 53 is formed with a slit 53*b* extending radially outward from the slot recess 53*a*.

Figure 19A:
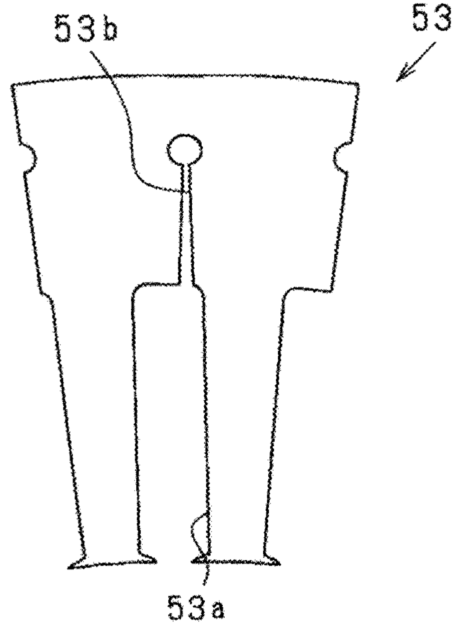
FIG. 19A is a partially enlarged view of a core sheet.
Figure 19B:
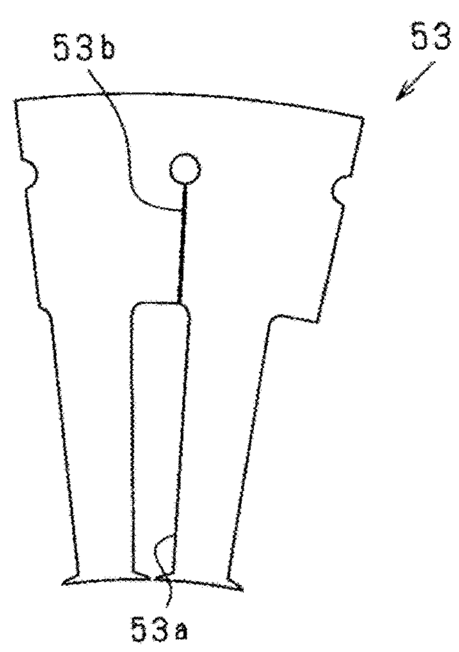
FIG. 19B is a partially enlarged view of a core sheet.

FIG. 19A and FIG. 19B are partially enlarged views of the core sheet 53. FIG. 19A shows a state before the core sheet 53 is bent into a helical shape, and FIG. 19B shows a state after the core sheet 53 is bent into a helical shape. In the state shown in FIG. 19A, the slit 53*b* has a substantially V-shape in which a side of the slot recess 53*a* is widened. Then, as shown in FIG. 19B, by bending the core sheet 53 in a helical shape, the core sheet 53 is deformed so that the slit 53*b* is closed.

Figure 20:
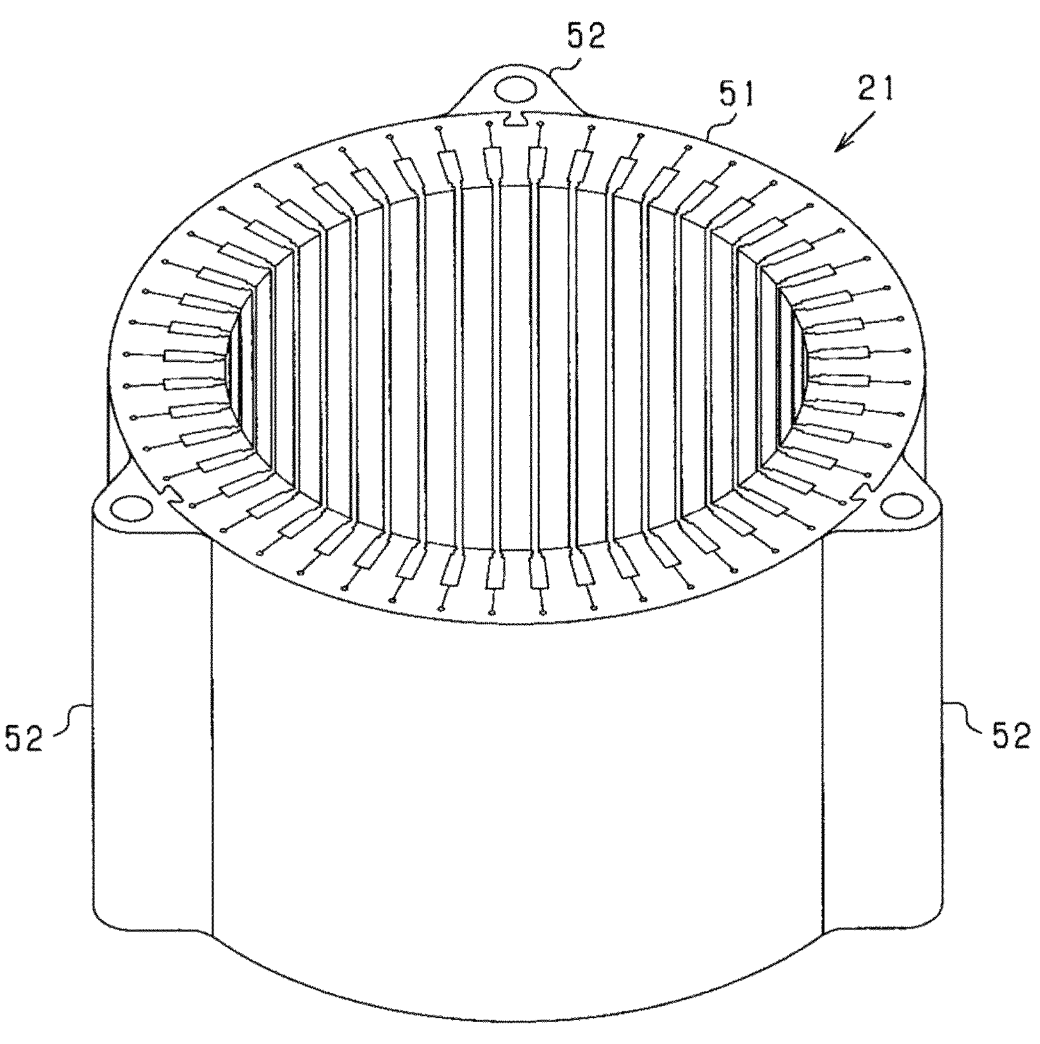
FIG. 20 is a perspective view showing a state in which bolt fixing portions are attached to the stator core.
Figure 21A:
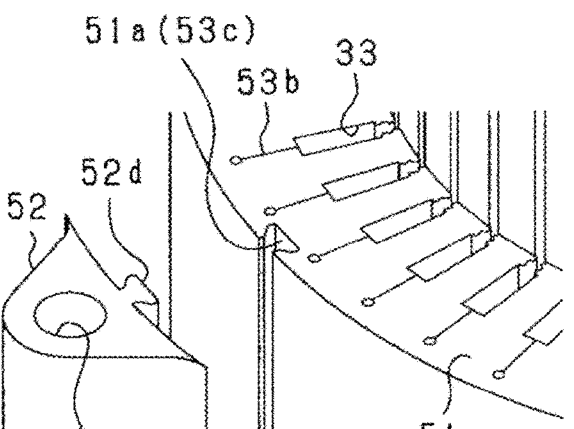
FIG. 21A is a perspective view showing the attachment portion of the bolt fixing portion to the core body in an enlarged manner.
Figure 21B:
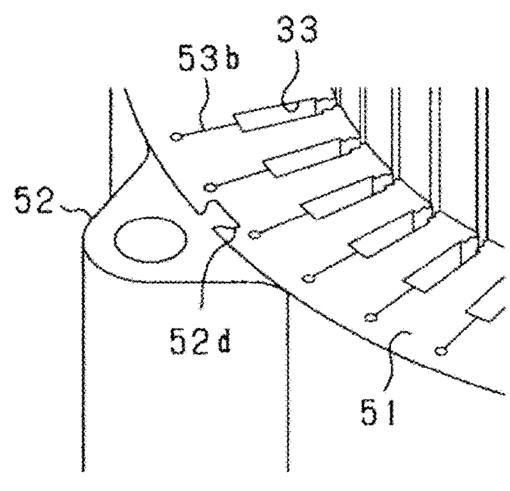
FIG. 21B is a perspective view showing the attachment portion of the bolt fixing portion to the core body in an enlarged manner.

FIG. 20 is a perspective view showing a state in which three bolt fixing portions 52 are attached to the stator core 21 of this embodiment. Moreover, FIG. 21A and FIG. 21B are perspective views showing the attachment portion of the bolt fixing portion 52 to the core body 51 in an enlarged manner.

In this embodiment, the outer peripheral surface of the core body 51 is provided with a groove portion 51*a* that extends straight in the axial direction, and the bolt fixing portion 52 is provided with a protruding portion 52*d* that extends straight in the axial direction. In this case, the core sheet 53 is provided with a plurality of outer peripheral recesses 53*c* at predetermined intervals on a side opposite to the slot opening side in the radial direction (i.e., on the outer peripheral side), and the outer peripheral recesses 53*c* of the core sheet 53 are arranged in a continuous manner to form the groove portion 51*a* by laminating the core sheet 53.

In the core sheet 53, the slot recess 53*a* corresponds to a "first portion" which is an opening recess for forming a slot, and the outer peripheral recess 53*c* corresponds to a "second portion". The groove portion 51*a* of the core body 51 corresponds to the one of the coupler pair. Further, the protruding portion 52*d* of the bolt fixing portion 52 corresponds to the other one of the coupler pair. The core sheet 53 is provided with outer peripheral recesses 53*c* at predetermined intervals in the circumferential direction, and the core sheet 53 is laminated in a helical manner while the circumferential positions of the outer peripheral recesses 53*c* are matched in the axial direction. In this embodiment, the number of slots in the stator core 21 is, e.g., 48, and the outer peripheral recesses 53*c* are provided for every 16 slot recesses 53*a*. If the number of the bolt fixing portions 52 is "m", it is preferable that the outer peripheral recesses 53*c* are provided in the core body 51 at intervals of "360°/(m×n)" (n is a natural number) in the circumferential direction.

The bolt fixing portion 52 is attached to the core body 51 by assembling the protruding portion 52*d* of the bolt fixing portion 52 into the groove portion 51*a* of the core body 51 by press fitting or the like. That is, the core body 51 and the bolt fixing portion 52 are coupled by a male-female fitting. In this case, the slot recesses 53*a* of the core sheet 53 are aligned in the circumferential direction by attaching the bolt fixing portions 52. In addition, it is preferable to perform a manufacturing process of the stator 13 in the following: temporarily forming the core body 51 in a cylindrical shape by laminating the core sheet 53 having a belt-shape in a helical manner, after that, a position adjusting process of the slots 33 is performed by attaching the bolt fixing portions 52 to the core body 51, further after that, a core sheet fixing process in the axial direction is performed by at least one of crimping, welding, and adhesion on the laminated core sheet 53.

When the core body 51 and the bolt fixing portion 52 are connected by fitting, the thermal stress is applied to the bolt fixing portion 52 due to frictional heat, and then the insulating resin layers on the surfaces of the core sheets may be in a state in which the permanent strain of the insulating resin layers on the surfaces of the core sheets have already settled. Therefore, since the bolt fastening axial tightening force is applied after the insulating resin layers are damaged with the permanent strain when the bolt is fastened at the bolt fixing portion 52, it is possible to suppress a decrease in the axial tightening force due to the permanent strain of the insulating resin layers on the surfaces of the core sheets.

As shown in FIG. 21A and FIG. 21B, a groove portion 51*a* is formed in the core body 51 at a central position between circumferentially adjacent slits 53*b*. If it is described in the structure of the core sheet 53, a slit 53*b* extending radially outward from the slot recess 53*a* is formed, and the outer peripheral recess 53*c* is formed at a center position between the circumferentially adjacent slot recesses 53*a*. The protruding portion 52*d* of the bolt fixing portion 52 has the same shape as the groove portion 51*a* of the core body 51, and the protruding portion 52*d* is assembled into the groove portion 51*a* by press-fitting. The groove portion 51*a* and the protruding portion 52*d* may each have a wedge shape that becomes wider toward an inner side in the radial direction. Alternatively, the bolt fixing portion 52 may be attached to the core body 51 by inserting the protruding portion 52*d* into the groove portion 51*a* and fixing by welding, brazing, or adhesion (adhesion involving heating). The bolt fixing portion 52 may be attached to the core body 51 only by press-fitting without welding, brazing, or the like.

Figure 22A:
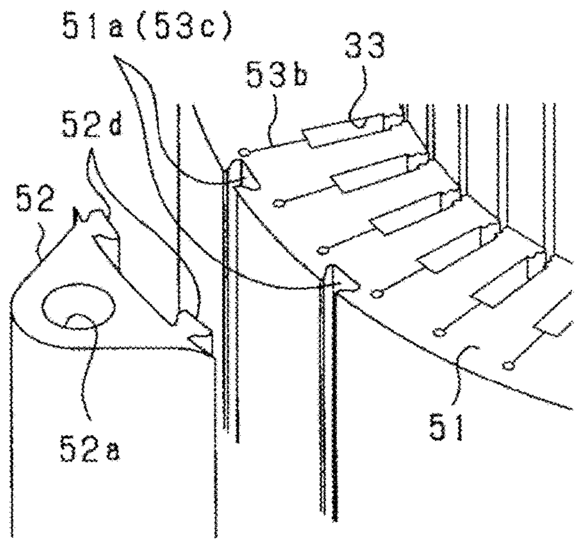
FIG. 22A is a perspective view showing the attachment portion of the bolt fixing portion to the core body in enlarged manner.
Figure 22B:
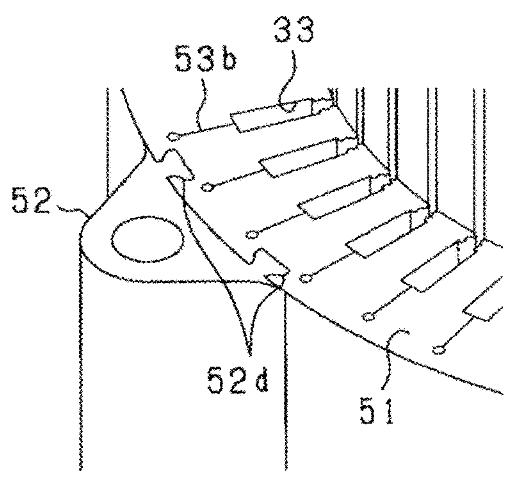
FIG. 22B is a perspective view showing the attachment portion of the bolt fixing portion to the core body in enlarged manner.

As shown in FIG. 22A and FIG. 22B, each bolt fixing portion 52 may be provided with two protruding portions 52*d*, and each of the protruding portions 52*d* is assembled into two groove portions 51*a* on a side of the core body 51.

In the stator core 21 having a laminated structure, there is a concern that position of slot recesses 53*a* of the core sheet 53 in the axial direction may shift in the circumferential direction. In this regard, in the above configuration, it is an employed structure in which the bolt fixing portion 52 separate from the core body 51 is used for positioning the slot recess 53*a* of the core sheets 53 in the circumferential direction. That is, it is an employed structure in which: the groove portion 51*a* extending straight in the axial direction is formed in the core body 51 by the outer peripheral recess 53*c* of the core sheet 53; the protruding portion 52*d* extending straight in the axial direction is formed in the bolt fixing portion 52; and the male coupler portion of the bolt fixing portion 52 is engaged to the female coupler portion of the core body 51. This makes it possible to align the slot recesses 53*a* in the core sheet 53 in a stacked state as the bolt fixing portion 52 is attached to the core body 51.

In the stator core 21 having a helical core structure, a concern of a position misalignment of the slots 33 in the circumferential direction may be increased when the core sheet 53 having the belt-shape is laminated in a helical manner. In this regard, the core sheet 53 is stacked in a helical manner while the circumferential positions of the outer peripheral recesses 53*c* are matched in the axial direction. Thereby, in the stator core 21 having a helical core structure, the slot recesses 53*a* in the core sheet 53 can be suitably aligned.

In the stator core 21 with a helical core structure, the slit 53*b* is formed in the core sheet 53 that extends radially outward from the slot recess 53*a*, which makes it suitable for stacking the core sheet 53 having a straight shape and the belt-shape in a helical manner. Further, since the outer peripheral recess 53*c* is formed at the center position between the circumferentially adjacent slits 53*b*, it is possible to suppress an excessive decrease of the strength of the core sheet 53 in a structure in which recesses 53*a*, 53*c* and the slits 53*b* are formed on both width direction sides of the core sheet 53, respectively.

Figure 23:
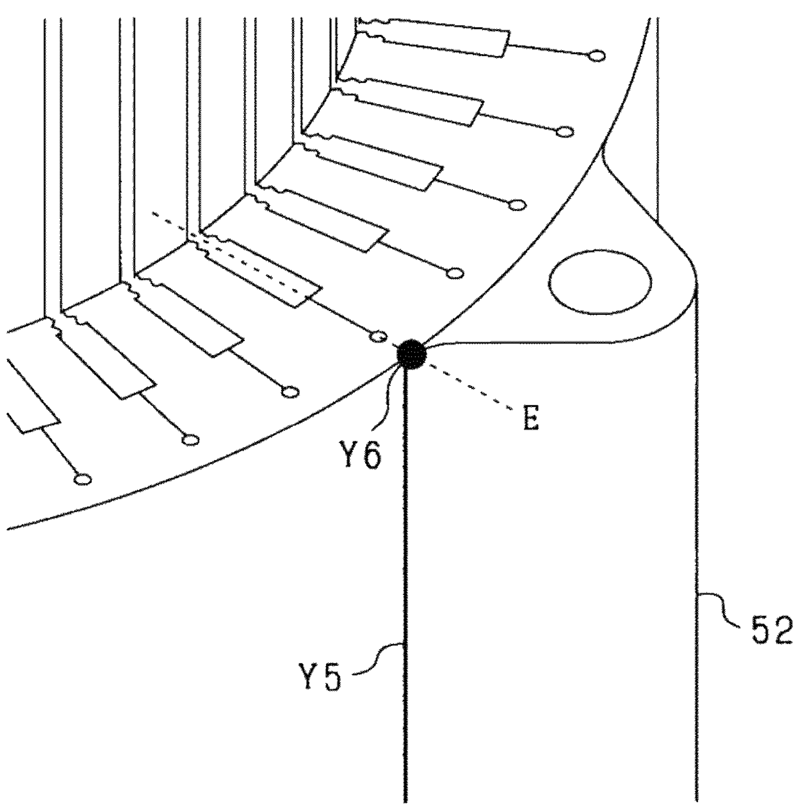
FIG. 23 is a perspective view showing a welded portion of the stator core.

As shown in FIG. 23, in the stator core 21 having a helical core structure, the welded portion for attaching the bolt fixing portion 52 to the outer peripheral surface of the core body 51 may be configured to also serve as a sheet fixing portion that fixes the longitudinal direction end of the core sheet 53 on the axial end surface of the core body 51. In FIG. 23, "Y5" is a welded portion of the bolt fixing portion 52 to the core body 51, and "Y6" is a welded portion of the longitudinal end portion "E" of the core sheet 53. As a result, in the core body 51 having a helical core structure, it is possible to prevent the longitudinal end of the core sheet 53 (i.e., the winding start end and winding finish end of the core sheet 53) from peeling and improve a workability performance in a welding work process.

Figure 24:
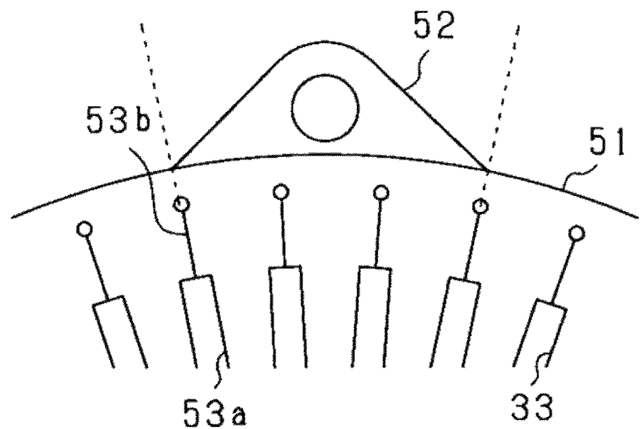
FIG. 24 is a plan view of the stator core.

Further, in the configuration using the core sheet 53 shown in FIG. 19A and FIG. 19B, the circumferential positional relationship between each slit 53*b* and the bolt fixing portion 52 may be defined as follows. In FIG. 24, in the circumferential direction, the positions of both circumferential ends of the bolt fixing portion 52 and the positions of the slits 53*b* are placed to substantially match each other. In this case, an annular rigidity of the stator core 21 is reduced. Therefore, it is possible to reduce stress generated when the bolt fixing portion 52 moves relative to the stator core 21 due to cold stress or the like.

Figure 25:
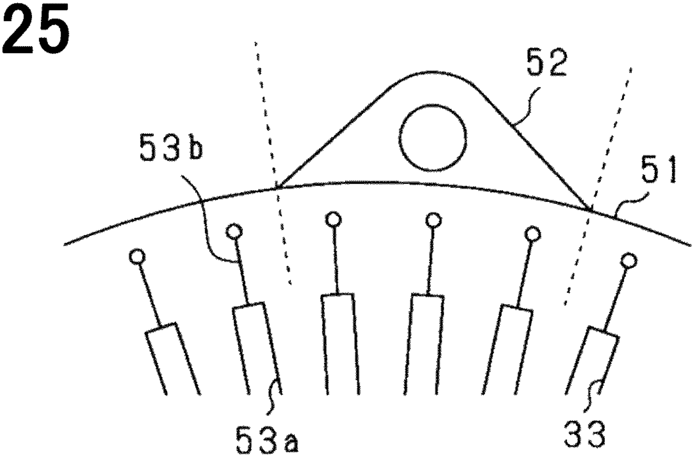
FIG. 25 is a plan view of the stator core.

Further, the positions of both circumferential ends of the bolt fixing portion 52 and the positions of the slits 53*b* do not match in the circumferential direction in FIG. 25. Specifically, the bolt fixing portion 52 is arranged such that both circumferential ends of the bolt fixing portion 52 are arranged on an approximate center position between the circumferentially adjacent slits 53*b*. In this case, since both circumferential ends of the bolt fixing portion 52 do not overlap on a portion of the helical core where a rigidity is low, it is possible to suppress stress concentration.

Figure 26:
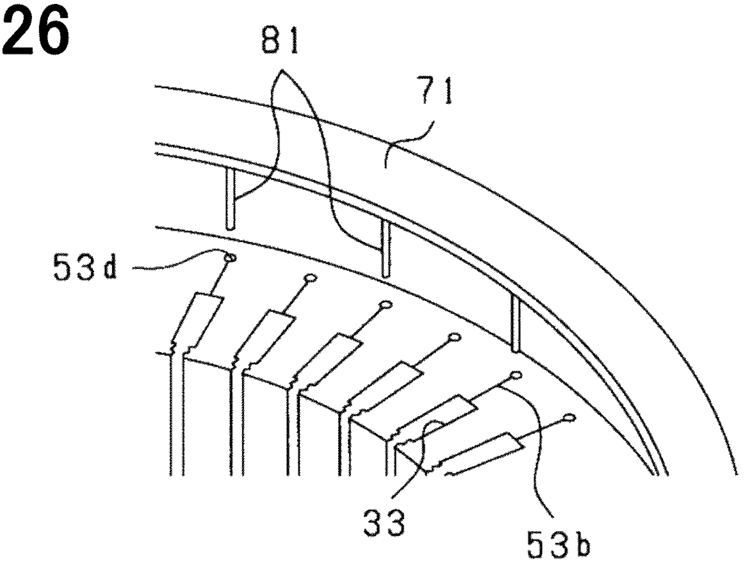
FIG. 26 is a perspective view of the stator core.

It is also possible to have a configuration in which the stator core 21 having a helical core structure and the end plate portion 71 in an annular shape described in FIG. 17A and FIG. 17B are combined. In this case, as shown in FIG. 26, the end plate portion 71 has a plurality of protruding portions 81 that are inserted into the circular holes 53*d* provided at root portions of the slits 53*b*. In a state where the end plate portion 71 is assembled to the axial direction end surface of the core body 51, a protrusion portion 81 on a side of the end plate portion 71 is inserted into a circular hole 53*d* on a side of the core body 51. This makes it possible to position the end plate portion 71 with respect to the core body 51, i.e., to position the bolt fixing portion 52. Note that the protruding portions 81 are preferably provided for each of the plurality of circular holes 53*d*. It is also possible to adopt a configuration in which the protruding portion 81 of the end plate portion 71 is inserted into the slot 33.

Modifications

In the above embodiment, a part of the configuration may be modified. Next, modifications of the present embodiments are described.

Figure 27:
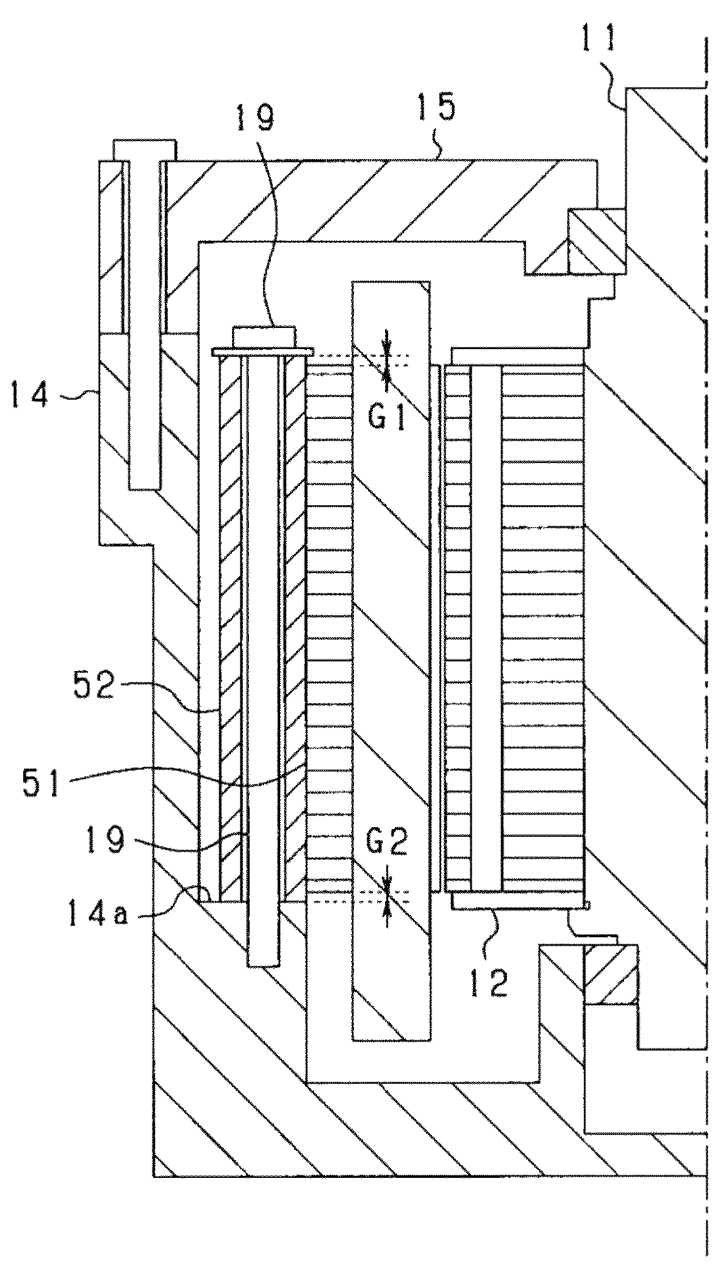
FIG. 27 is a vertical cross-sectional view of a rotary electric machine.

In at least one of the both axial direction ends of the core body 51, the bolt fixing portion 52 is preferably attached while protruding more in the axial direction than the axial direction end surface of the core body 51. Specifically, in the configuration shown in FIG. 27, a side of the lower end of the bolt fixing portion 52 comes in contact with the base portion 14*a* of the housing 14, and a side of the upper end of the bolt fixing portion 52 comes in contact with the bolt head. Further, in the stator core 21, the length of the bolt fixing portion 52 in the axial direction is longer than the length of the core body 51 in the axial direction. In this case, since the lower end of the bolt fixing portion 52 protrudes below the lower end surface of the core body 51, the lower end surface of the core body 51 does not come in contact with the base portion 14*a* (denoted as G2 in the drawings). Further, since the upper end of the bolt fixing portion 52 projects upwardly than the upper end surface of the core body 51, the upper end surface of the core body 51 does not come into contact with the bolt head (G1 in the drawing).

In the above configuration, the fixing bolts 19 are fastened and fixed to the housing 14 to which the stator is fixed, in a state in which the core body 51 is separated from the housing 14 and the fixing bolts 19. This effectively suppresses a decrease in the axial tightening force in the core body 51. Note that the bolt fixing portion 52 may have only one of a structure in which the lower end portion of the bolt fixing portion 52 protrudes below the lower end surface of the core body 51, and a structure in which the upper end portion of the bolt fixing portion 52 protrudes above the upper end surface of the core body 51.

In the fifth embodiment described above, although a concave female portion (groove portion 51*a*) is provided on a side of the core body 51 and a convex male portion (protruding portion 52*d*) is provided on a side of the bolt fixing portion 52 in the configuration in which the core body 51 and the bolt fixing portion 52 are coupled by a male-female fitting, this may be changed. That is, a convex male portion may be provided on a side of the core body 51, and a concave female portion may be provided on a side of the bolt fixing portion 52.

Moreover, in a core structure in which a large number of annular core sheets 53 are laminated, instead of a helical core structure, the core body 51 and the bolt fixing portion 52 may be connected by a male-female fitting.

Figure 28A:
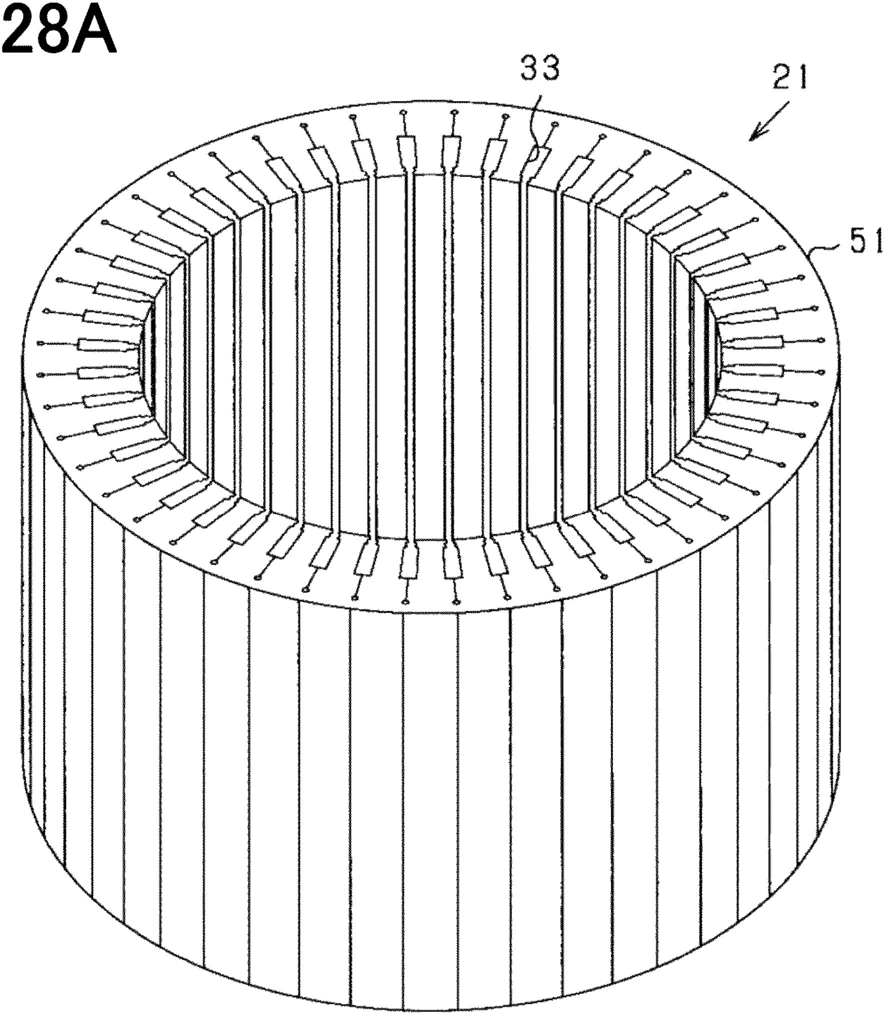
FIG. 28A is a diagram showing the stator core in another example.
Figure 28B:
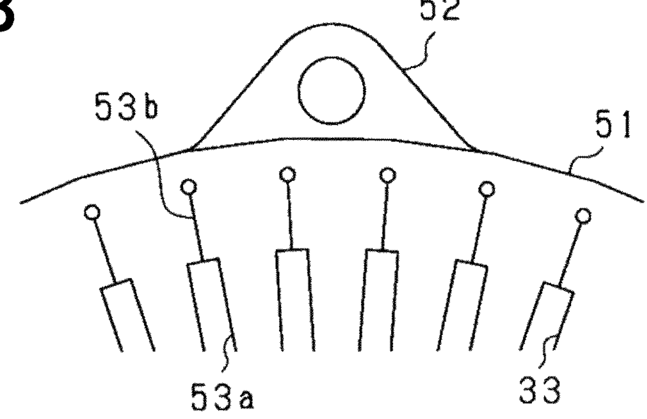
FIG. 28B is a diagram showing the stator core in another example.

In a configuration in which a slit 53*b* is provided for each slot recess 53*a* in the core sheet 53, the outer periphery of the core body 51 has a polygonal shape, as shown in FIG. 28A. For example, in a core body 51 having 48 slots 33, the core body 51 becomes a 48-sided cylinder. In this case, as shown in FIG. 28B, the joint surface of the bolt fixing portion 52 may be formed into a polygonal shape to match the outer peripheral surface of the core body 51. In this case, a positioning effect in the circumferential direction can be obtained in the bolt fixing portion 52.

Figure 29:
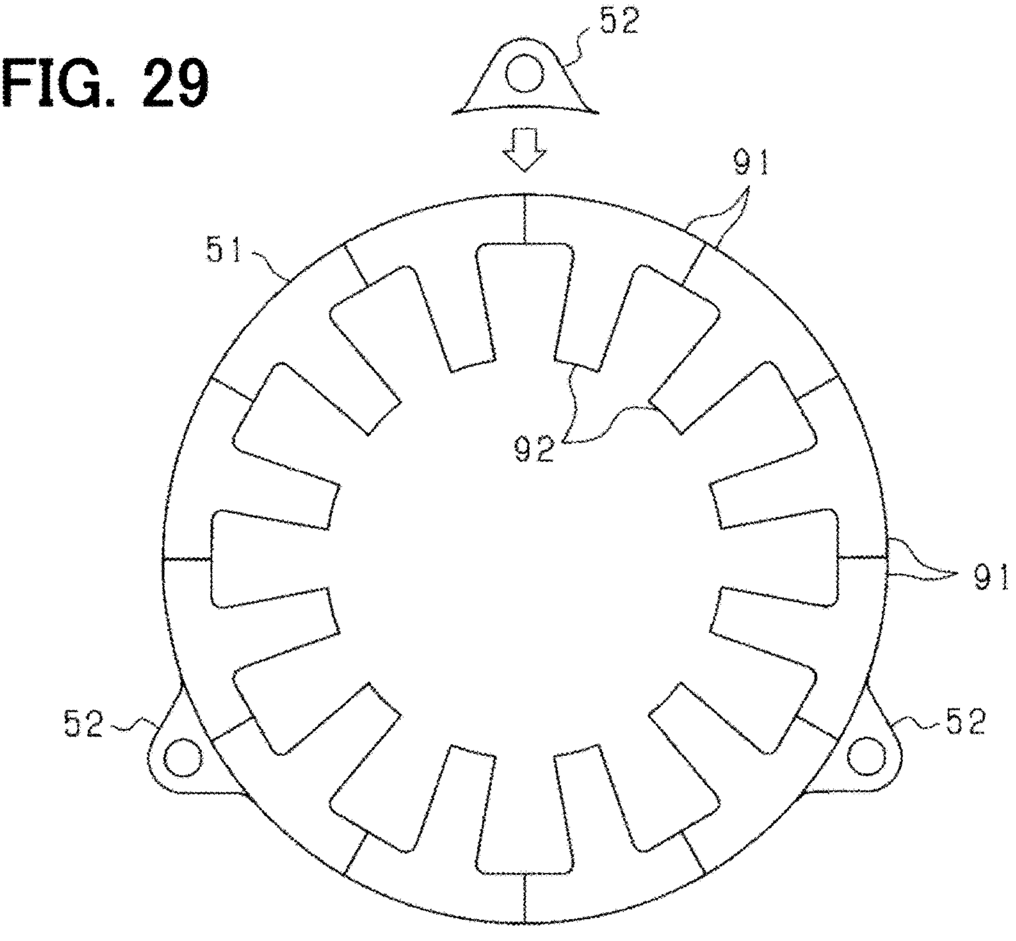
FIG. 29 is a plan view of the stator core.

The core body 51 may be constituted by a dividable core that can be divided into a plurality of divided pieces in the circumferential direction. Specifically, as shown in FIG. 29, the core body 51 has a plurality of divided cores 91. The divided cores 91 are laminate bodies of steel plates made up of electromagnetic steel plates stacked in the axial direction. Each divided core 91 has teeth 92 around which a stator winding is wound. The core body 51 is formed into a cylindrical shape by joining the circumferential end surfaces of the divided cores 91 each other.

Bolt fixing portions 52 are attached to the core body 51 so as to placed over two circumferentially adjacent divided cores 91. The bolt fixing portion 52 is fixed to the divided cores 91 of the core body 51 by, e.g., welding. That is, the bolt fixing portion 52 is arranged at a position straddling a boundary line of two divided cores 91 arranged in the circumferential direction, and is fixed to each of two divided cores 91 by welding or the like. In this case, the bolt fixing portion 52 also serves to connect the divided cores 91 arranged in the circumferential direction.

Figure 30A:
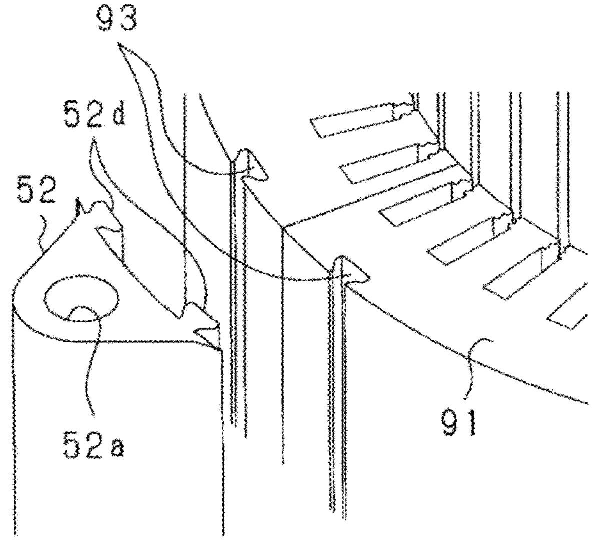
FIG. 30A is a perspective view showing the attachment portion of the bolt fixing portion to the core body in an enlarged manner.
Figure 30B:
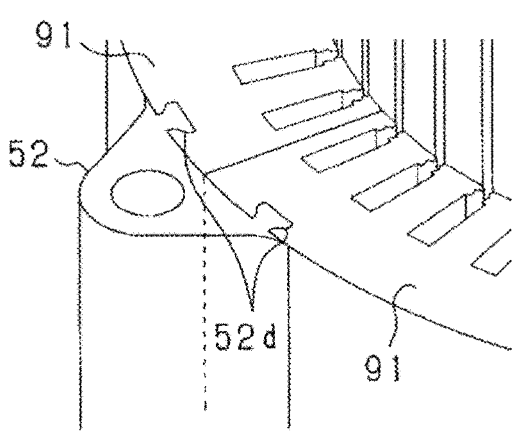
FIG. 30B is a perspective view showing the attachment portion of the bolt fixing portion to the core body in an enlarged manner.

The fixing structure of the bolt fixing portion 52 to the core body 51 may have a configuration shown in FIG. 30A and FIG. 30B. In the configurations of FIG. 30A and FIG. 30B, groove portions 93 extending in the axial direction are formed in each of the circumferentially adjacent divided cores 91, respectively. On the other hand, the bolt fixing portion 52 is formed with protruding portions 52*d* extending in the axial direction at two locations. The protruding portion 52*d* is assembled into the groove portions 93 of the divided core 91 by press-fitting or the like. It may be a structure in which the bolt fixing portion 52 is fixed to each one of the divided cores 91 by welding, brazing, or adhesion (bonding that involves heating) in a state in which the protruding portion 52*d* is inserted into the groove portions 93.

The plurality of bolt fixing portions 52 provided in the circumferential direction of the core body 51 may be arranged at unequal intervals in the circumferential direction instead of being arranged at equal intervals in the circumferential direction. In this embodiment, as described above, the core body 51 and the bolt fixing portion 52 are constructed from separate members, and the mounting position of each bolt fixing portion 52 can be easily changed.

The stator core 21 may have a configuration in which the plurality of bolt fixing portions 52 attached to the core body 51 have different shapes or different sizes. For example, at least one of the axial length and the circumferential width of the bolt fixing portion 52, the hole diameter of the bolt insertion hole 52*a*, and the radial position of the bolt insertion hole 52*a* from the outer peripheral surface of the core may not be the same for all of the bolt fixing portions 52. In this case, in the assembly structure in which the stator core 21 is assembled to the housing 14, the degree of freedom in the assembly form can be improved.

Figure 31:
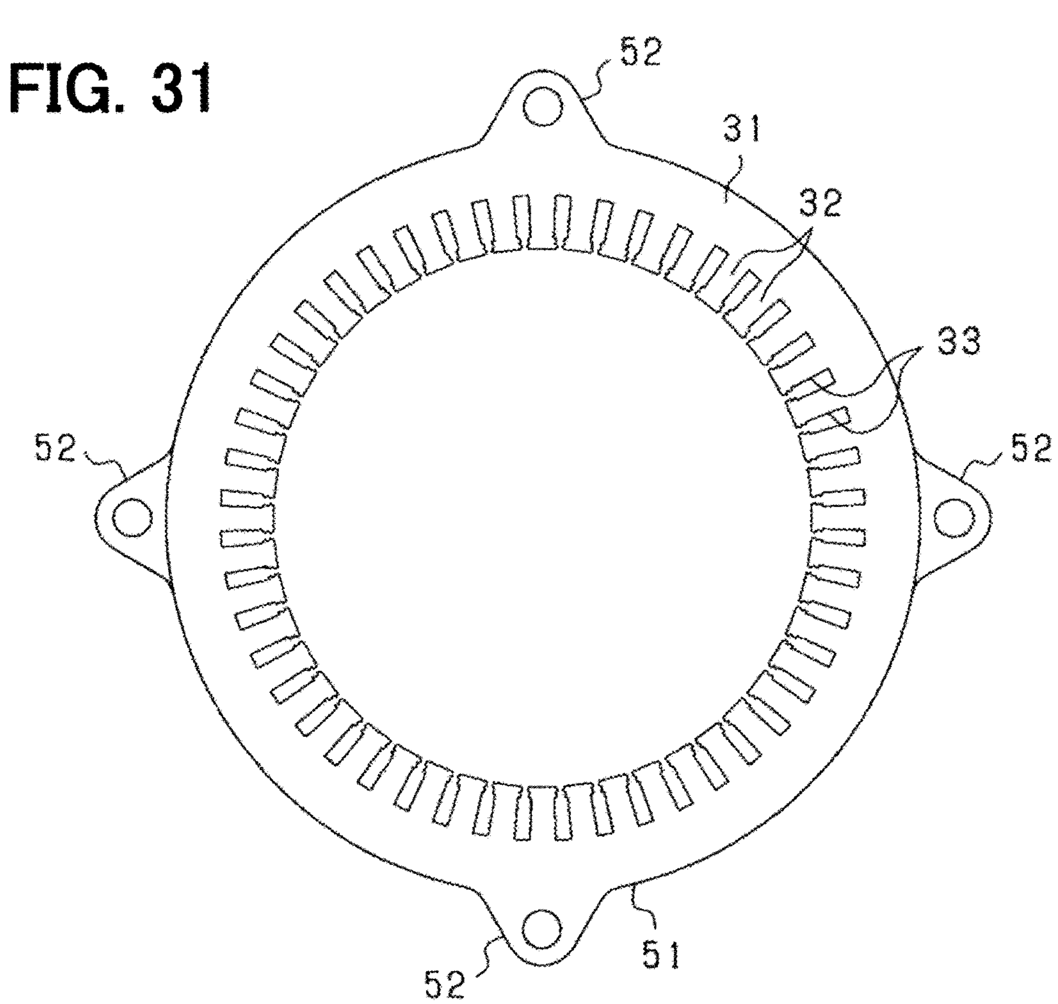
FIG. 31 is a plan view of the stator core in another example.

In the embodiment described above, although all of the plurality of bolt fixing portions 52 are configured separately from the core body 51 in a structure in which the stator core 21 has the plurality of bolt fixing portions 52, this may be changed. For example, some of the bolt fixing portions 52 among the plurality of bolt fixing portions 52 are provided as an integral member with the core body 51, and the remaining bolt fixing portions 52 are provided as separate members from the core body 51. Specifically, as shown in FIG. 31, in the stator core 21 having four bolt fixing portions 52, two of the four bolt fixing portions 52 are provided integrally with the core body 51, and the remaining two bolt fixing portions 52 are provided as separate members from the core body 51. It is also possible to make only one of the four (plural) bolt fixing portions 52 as an integral member with the core body 51, and to make all the others as separate members from the core body 51.

The bolt fixing portion 52 may be configured to be able to be divided into a plurality of pieces (about several pieces) in the axial direction.

The core body 51 and the bolt fixing portions 52 may be configured to be different in at least one of the following: material, heat treatment, machining, and plate thickness. For example, the core body 51 is made of an electromagnetic steel plate, and the bolt fixing portions 52 are made of a general steel plate. As a result, it is possible to reduce the amount of expensive electromagnetic steel sheet used and improve the strength and toughness of the bolt fixing portions 52.

Figure 32:
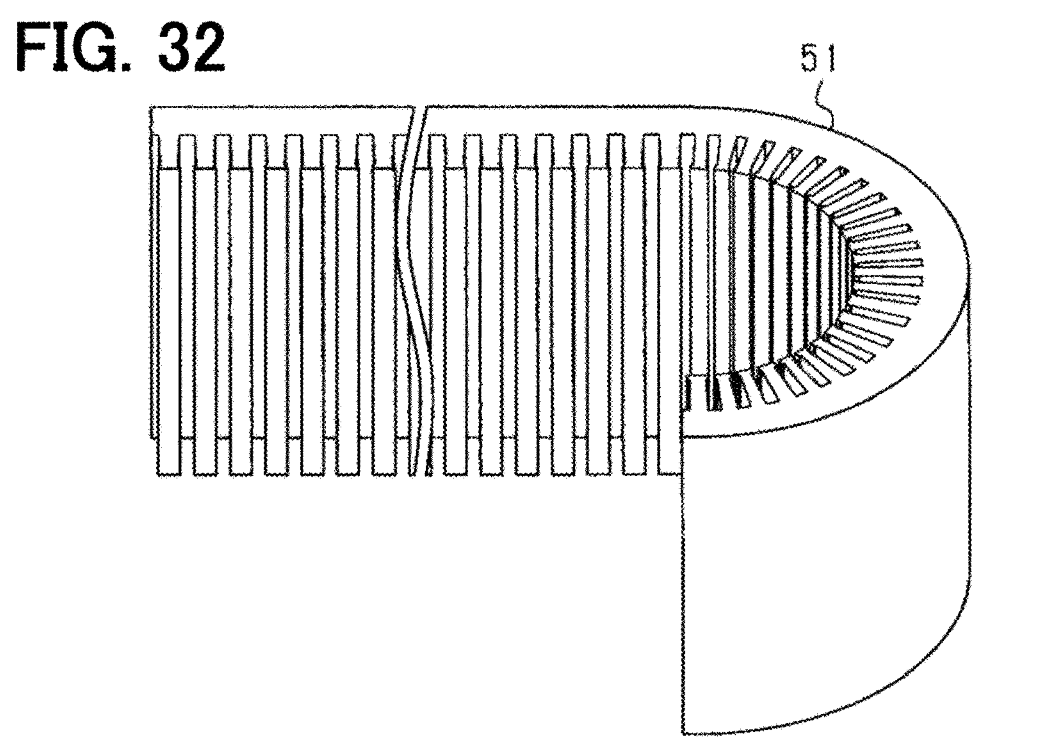
FIG. 32 is a perspective view showing a configuration of the stator core in another example.

As the stator core 21, it is also possible to use a stator core having a curling core structure shown in FIG. 32. In this case, in a manufacturing process of the core, a plurality of core sheets 53 (electromagnetic steel sheets) cut to a length corresponding to the circumference of the stator core 21 are laminated, and the laminated body is bent into a cylindrical shape. Then, the ends of the laminated body are joined together by welding or the like.

In the above embodiment, the stator winding 22 has a segment structure using the conductor segments 40, but this may be changed. For example, the stator winding 22 may be formed by winding a continuous wire around each slot 33 of the stator core 21 by wave winding.

The core body 51 may use a steel plate other than the electromagnetic steel plate as the core sheet 53. The core body 51 may be, e.g., the laminated body made of SPCC (Steel Plate Cold Commercial).

The stator core 21 may be fixed to a stator fixing member other than the housing 14. For example, in a rotary electric machine provided in a moving body such as a vehicle, it may be fixed to a frame of the moving body.

It is also possible to apply the technology of the present disclosure to a rotary electric machine with an outer rotor structure (external rotor structure). In this case, in the stator core, the bolt fixing portion may be attached to an outside (i.e., on a side of a hollow portion of the core body) of an outer peripheral surface of a radial direction inner side of the core body.

What is claimed is:

1. A stator core comprising:

a stator core fixed to a stator fixing member by a fixing bolt, a core body in a cylindrical shape; and a bolt fixing portion which includes an insertion portion extending in an axial direction of the core body and through which the fixing bolt is inserted and is able to be fixed to the stator fixing member by the fixing bolt while the fixing bolt is inserted into the insertion portion, wherein the core body is a laminated body in which a core sheet made of a steel plate having an insulating resin layer on surfaces are laminated, and wherein the bolt fixing portion is provided as a separate member from the core body, and is attached to an outside of an outer peripheral surface of the core body in a radial direction, wherein the bolt fixing portion, not the laminated body of the core body, includes:

two end plate portions provided on both axial direction sides of the bolt fixing portion and fixed to the core body; and an insertion body which forms the insertion portion and is disposed to be sandwiched between the two end plate portions on both axial direction sides, wherein a head side end plate portion on a side of a head portion of the fixing bolt among the two end plate portions provided on the both axial direction sides of the bolt fixing portion is flush with an axial direction end surface of the core body and is arranged to be in contact with the outer peripheral surface of the core body, and wherein the head side end plate portion is joined to the core body by welding on a side opposite to the axial direction end surface of the core body among both axial direction surfaces of the head side end plate portion.

2. The stator core according to claim 1, wherein the bolt fixing portion has a length in the axial direction shorter than a length of the core body in the axial direction.

3. The stator core according to claim 2, wherein the bolt fixing portion is attached to the core body such that at least one of axial direction end surfaces on both axial direction sides is located at a core middle position in the axial direction on the outer peripheral surface of the core body, and wherein a position of an axial direction end surface of the bolt fixing portion, which is a core middle position, does not match with a lamination boundary line of the core sheet extending in a circumferential direction of the core body.

4. The stator core according to claim 2, wherein the bolt fixing portion is attached to the core body such that at least one of axial direction end surfaces on both axial direction sides is located at a core middle position in the axial direction on the outer peripheral surface of the core body, and wherein the axial direction end surface of the bolt fixing portion at a core middle position is provided with an uneven portion having an uneven shape in the axial direction at least on a side facing the outer peripheral surface of the core body.

5. The stator core according to claim 1, wherein the core body is a helical core structure in which a core sheet having a belt-shape is laminated in a helical manner, and wherein the bolt fixing portion is welded to the outer peripheral surface of the core body, and a welded portion thereof also serves as a sheet fixing portion that fixes a longitudinal end of the core sheet on an axial direction end surface of the core body.

6. A stator core comprising:

a stator core fixed to a stator fixing member by a fixing bolt, a core body in a cylindrical shape; and a bolt fixing portion which includes an insertion portion extending in an axial direction of the core body and through which the fixing bolt is inserted and is able to be fixed to the stator fixing member by the fixing bolt while the fixing bolt is inserted into the insertion portion, wherein the core body is a laminated body in which a core sheet made of a steel plate having an insulating resin layer on surfaces are laminated, and wherein the bolt fixing portion is provided as a separate member from the core body, and is attached to an outside of an outer peripheral surface of the core body in a radial direction, and wherein the bolt fixing portion has a length in the axial direction shorter than a length of the core body in the axial direction, and wherein the bolt fixing portion is attached to the core body such that at least one of axial direction end surfaces on both axial direction sides is located at a core middle position in the axial direction on the outer peripheral surface of the core body, and wherein the axial direction end surface of the bolt fixing portion at a core middle position is provided with an uneven portion having an uneven shape in the axial direction at least on a side facing the outer peripheral surface of the core body.

7. The stator core according to claim 6, wherein a position of an axial direction end surface of the bolt fixing portion, which is a core middle position, does not match with a lamination boundary line of the core sheet extending in a circumferential direction of the core body.

8. The stator core according to claim 7, wherein the uneven portion intersects with the lamination boundary line.

* * * * *